US012198709B2

(12) United States Patent
Küch et al.

(10) Patent No.: US 12,198,709 B2
(45) Date of Patent: Jan. 14, 2025

(54) APPARATUS AND METHOD FOR ENCODING A SPATIAL AUDIO REPRESENTATION OR APPARATUS AND METHOD FOR DECODING AN ENCODED AUDIO SIGNAL USING TRANSPORT METADATA AND RELATED COMPUTER PROGRAMS

(71) Applicant: Fraunhofer-Gesellschaft zur Förderung der angewandten Forschung e.V., Munich (DE)

(72) Inventors: Fabian Küch, Erlangen (DE); Oliver Thiergart, Erlangen (DE); Guillaume Fuchs, Erlangen (DE); Stefan Döhla, Erlangen (DE); Alexandre Bouthéon, Erlangen (DE); Jürgen Herre, Erlangen (DE); Stefan Bayer, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 338 days.

(21) Appl. No.: 17/375,465

(22) Filed: Jul. 14, 2021

(65) Prior Publication Data

US 2021/0343300 A1 Nov. 4, 2021

Related U.S. Application Data

(63) Continuation of application No. PCT/EP2020/051396, filed on Jan. 21, 2020.

(30) Foreign Application Priority Data

Jan. 21, 2019 (EP) .................................... 19152911

(51) Int. Cl.
*G10L 19/032* (2013.01)
*G10L 19/26* (2013.01)
(Continued)

(52) U.S. Cl.
CPC ............ *G10L 19/032* (2013.01); *G10L 19/26* (2013.01); *H04S 1/002* (2013.01); *H04S 7/307* (2013.01);
(Continued)

(58) Field of Classification Search
None
See application file for complete search history.

(56) References Cited

U.S. PATENT DOCUMENTS 8,891,797 B2 * 11/2014 Thiergart ............ G10L 21/0272 381/356
2011/0222694 A1 9/2011 Del Galdo et al.
(Continued)

FOREIGN PATENT DOCUMENTS

CN 107430863 A 12/2017
EP 2873071 A1 5/2015
(Continued)

OTHER PUBLICATIONS

Thiergart., O., et al.; "Localization of Sound Sources in Reverberant Environments Based on Directional Audio Coding Parameters;" AES Convention 127; Paper No. 7853; Oct. 2009 ; pp. 1-14.
(Continued)

*Primary Examiner* — Douglas Godbold
(74) *Attorney, Agent, or Firm* — McClure, Qualey & Rodack, LLP

(57) ABSTRACT

An apparatus for encoding a spatial audio representation representing an audio scene to obtain an encoded audio signal includes: a transport representation generator for generating a transport representation from the spatial audio
(Continued)

representation, and for generating transport metadata related to the generation of the transport representation or indicating one or more directional properties of the transport representation; and an output interface for generating the encoded audio signal, the encoded audio signal including information on the transport representation, and information on the transport metadata.

34 Claims, 19 Drawing Sheets

(51) Int. Cl.
*H04S 1/00* (2006.01)
*H04S 7/00* (2006.01)

(52) U.S. Cl.
CPC ....... *H04S 2420/11* (2013.01); *H04S 2420/13* (2013.01)

(56) References Cited

U.S. PATENT DOCUMENTS

| | | | |
|---|---|---|---|
| 2012/0114126 A1 | 5/2012 | Thiergart et al. | |
| 2015/0142427 A1 | 5/2015 | Terentiv et al. | |
| 2015/0154965 A1 | 6/2015 | Wuebbolt | |
| 2016/0029139 A1 | 1/2016 | Lee et al. | |
| 2016/0125887 A1 | 5/2016 | Purnhagen et al. | |
| 2017/0164130 A1* | 6/2017 | Krueger | G10L 19/008 |
| 2017/0332185 A1* | 11/2017 | Villemoes | H04S 3/008 |
| 2017/0365263 A1 | 12/2017 | Disch | |
| 2018/0277127 A1* | 9/2018 | Kordon | G10L 19/008 |
| 2019/0394606 A1* | 12/2019 | Tammi | G10L 19/008 |
| 2021/0051430 A1* | 2/2021 | Eronen | G10L 19/008 |
| 2021/0176579 A1* | 6/2021 | Laitinen | H04R 3/005 |
| 2021/0319799 A1* | 10/2021 | Pihlajakuja | G10L 19/008 |
| 2022/0303711 A1* | 9/2022 | Laitinen | G10L 19/008 |

FOREIGN PATENT DOCUMENTS

| | | |
|---|---|---|
| JP | 2016-522911 A | 8/2016 |
| RU | 2 628 195 C2 | 8/2017 |
| WO | 2010/017967 A1 | 2/2010 |
| WO | 2014012944 A1 | 1/2014 |
| WO | 2017/157803 A1 | 9/2017 |
| WO | 2018162803 A1 | 9/2018 |

OTHER PUBLICATIONS

Van Veen., B.D.; et al.; "Beamforming: a versatile approach to spatial filtering;" IEEE ASSP Mag.; vol. 5; No. 2; Apr. 1998; pp. 4-24.
Williams, E.G.; "Fourier Acoustics: Sound Radiation and Nearfield Acoustical Holography;" Academic Press; 1999; pp. 1-321.
Laitinen, M.V., et al.; "Converting 5.1 audio recordings to B-format for directional audio coding reproduction;" 2011 IEEE International Conference on Acoustics, Speech and Signal Processing (ICASSP); 2011; pp. 61-64.
Nachbar, C., et al.; "AMBIX—A Suggested Ambisonics Format;" Proceedings of the Ambisonics Symposium 2011; Jun. 2011; pp. 1-12.
Pulkki, V., et al.; "Spatial Sound Reproduction with Directional Audio Coding;" Laboratory of Acoustics and Audio Signal Processing; J. Audio Eng. Soc.; vol. 55; No. 6; Jun. 2007; pp. 503-516.
Pulkki, V.; "Virtual Sound Source Positioning Using Vector Base Amplitude Panning;" Laboratory of Acoustics and Audio Signal Processing; J. Audio Eng. Soc.; vol. 45; Issue 6; Jun. 1997; pp. 456-466.
Laitinen, M.V., et al.; "Using Spaced Microphones with Directional Audio Coding;" AES Convention 130; Paper No. 3433; May 2011; pp. 1-8.
Vilkamo, J., et al.; "Minimization of Decorrelator Artifacts in Directional Audio Coding by Covariance Domain Rendering;" J. Audio Eng. Soc .; vol. 61; No. 9; Sep. 2013; pp. 637-646.
Furness, R.K.; "Ambisonics—An overview;" AES 8th International Conference; Apr. 1990; pp. 181-189.
Russian language office action dated Jan. 21, 2022, issued in application No. RU 2021124719.
English language translation of Russian language office action dated Jan. 21, 2022.
English language office action dated Mar. 29, 2023, issued in application No. SG 11202107802V.
Pulkki, V.; "Directional Audio Coding in Spatial Sound Reproduction and Stereo Upmixing;" Directional Audio Coding in Spatial Sound; AES 28th International Conference; Jun. 2006; pp. 1-8.
Japanese language office action dated Sep. 13, 2022, issued in application No. JP 2021-542163.
English language translation of office action dated Sep. 13, 2022, issued in application No. JP 2021-542163 (pp. 1-7 of attachment).
International Search Report and Written Opinion issued in application No. PCT/EP2020/051396.
Brandstein, M., et al.; "4 Spatial Coherence Functions for Differential Microphones in Isotropic Noise Fields—Microphone Arrays: Signal Processing Techniques and Applications;" Springer-Verlag Berlin Heidelberg GmbH; 2001; pp. 61-85.
Chinese language Notice of Allowance dated Oct. 29, 2024, issued in application No. CN 202080010287.X.
English language translation of Notice of Allowance dated Oct. 29, 2024 (pp. 5-6 of attachment).

* cited by examiner

771

| speaker | ref. signal sel./generator | T-metadata |
| --- | --- | --- |
| L | T1/T1 | T1: left/front (omni or cardioid) |
| R | T2/T1 | |
| $L_s$ | T1/T2 | T2: right/back (omni or cardioid) |
| $R_s$ | T2/T2 | |
| C | T1+T2/T1 | |

| | shape parameter | look direction |
|---|---|---|
| $C_M = 1$ | omnidirectional | left |
| | | right |
| $C_M = 0.5$ | cardioid | front |
| | | back |
| $C_M = 0$ | dipole | up |
| | | down |
| | | (quantized) $\phi$, $\vartheta$ |
| | | left/right pair |
| | | front/back pair |

APPARATUS AND METHOD FOR ENCODING A SPATIAL AUDIO REPRESENTATION OR APPARATUS AND METHOD FOR DECODING AN ENCODED AUDIO SIGNAL USING TRANSPORT METADATA AND RELATED COMPUTER PROGRAMS

CROSS-REFERENCES TO RELATED APPLICATIONS

This application is a continuation of copending International Application No. PCT/EP2020/051396, filed Jan. 21, 2020, which is incorporated herein by reference in its entirety, and additionally claims priority from European Application No. 19152911.4, filed Jan. 21, 2019, which is incorporated herein by reference in its entirety.

BACKGROUND OF THE INVENTION

Embodiments of the invention relate to transport channel or downmix signaling for directional audio coding.

Directional Audio Coding (DirAC) technique [Pulkki07] is an efficient approach to the analysis and reproduction of spatial sound. DirAC uses a perceptually motivated representation of the sound field based on spatial parameters, i.e., the direction of arrival (DOA) and diffuseness measured per frequency band. It is built upon the assumption that at one time instant and at one critical band, the spatial resolution of auditory system is limited to decoding one cue for direction and another for inter-aural coherence. The spatial sound is then represented in the frequency domain by cross-fading two streams: a non-directional diffuse stream and a directional non-diffuse stream.

DirAC was originally intended for recorded B-format sound but can also be extended for microphone signals matching a specific loudspeaker setup like 5.1 [2] or any configuration of microphone arrays [5]. In the latest case, more flexibility can be achieved by recording the signals not for a specific loudspeaker setup, but instead recording the signals of an intermediate format.

Such an intermediate format, which is well-established in practice, is represented by (higher-order) Ambisonics [3]. From an Ambisonics signal, one can generate the signals of every desired loudspeaker setup including binaural signals for headphone reproduction. This requires a specific renderer which is applied to the Ambisonics signal, using either a linear Ambisonics renderer [3] or a parametric renderer such as Directional Audio Coding (DirAC).

An Ambisonics signal can be represented as a multi-channel signal where each channel (referred to as Ambisonics component) is equivalent to the coefficient of a so-called spatial basis function. With a weighted sum of these spatial basis functions (with the weights corresponding to the coefficients) one can recreate the original sound field in the recording location [3]. Therefore, the spatial basis function coefficients (i.e., the Ambisonics components) represent a compact description of the sound field in the recording location. There exist different types of spatial basis functions, for example spherical harmonics (SHs) [3] or cylindrical harmonics (CHs) [3]. CHs can be used when describing the sound field in the 2D space (for example for 2D sound reproduction) whereas SHs can be used to describe the sound field in the 2D and 3D space (for example for 2D and 3D sound reproduction).

As an example, an audio signal f (t) which arrives from a certain direction (φ, θ) results in a spatial audio signal f (φ, θ, t) which can be represented in Ambisonics format by expanding the spherical harmonics up to a truncation order H:

$$f(\varphi, \theta, t) = \sum_{l=0}^{H} \sum_{m=-l}^{+l} Y_l^m(\varphi, \theta)\phi_{lm}(t)$$

whereby $Y_l^m(\varphi, \theta)$ being the spherical harmonics of order l and mode m, and $\phi_{lm}(t)$ the expansion coefficients. With increasing truncation order H the expansion results in a more precise spatial representation. Spherical harmonics up to order H=4 with Ambisonics Channel Numbering (ACN) index are illustrated in FIG. 1*a* for order n and mode m.

DirAC was already extended for delivering higher-order Ambisonics signals from a first order Ambisonics signal (FOA as called B-format) or from different microphone arrays [5]. This document focuses on a more efficient way to synthesize higher-order Ambisonics signals from DirAC parameters and a reference signal. In this document, the reference signal, also referred to as the down-mix signal, is considered a subset of a higher-order Ambisonics signal or a linear combination of a subset of the Ambisonics components.

In the DirAC analysis the spatial parameters of DirAC are estimated from the audio input signals. Originally, DirAC has been developed for first-order Ambisonics (FOA) input that can e.g. be obtained from B-format microphones, however other input signals are well possible, too. In the DirAC synthesis, the output signals for the spatial reproduction, e.g., loudspeaker signals, are computed from the DirAC parameters and the associated audio signals. Solutions have been described for using an omnidirectional audio signal only for the synthesis or for using the entire FOA signal [Pulkki07]. Alternatively, only a subset of the four FOA signal components can be used for the synthesis.

Due to its efficient representation of spatial sound, DirAC is also well suited as basis for spatial audio coding systems. The objective of such a system is to be able to code spatial audio scenes at low bit-rates and to reproduce the original audio scene as faithfully as possible after transmission. In this case the DirAC analysis is followed by a spatial metadata encoder, which quantizes and encodes DirAC parameters to obtain a low bit-rate parametric representation. Along with the metadata, a down-mix signal derived from the original audio input signals is coded for transmission by a conventional audio core-coder. For example, an EVS-based audio coder can be adopted for coding the down-mix signal. The down-mix signal consists of different channels, called transport channels: The down-mix signal can be e.g. the four coefficient signals composing a B-format signal (i.e., FOA), a stereo pair, or a monophonic down-mix depending of the targeted bit-rate. The coded spatial parameters and the coded audio bit-stream are multiplexed before transmission.

Context: System Overview of a DirAC-Based Spatial Audio Coder

In the following, an overview of a state-of-the-art spatial audio coding system based on DirAC designed for Immersive Voice and Audio Services (IVAS) is presented. The objective of such a system is to be able to handle different spatial audio formats representing the audio scene and to code them at low bit-rates and to reproduce the original audio scene as faithfully as possible after transmission.

The system can accept as input different representations of audio scenes. The input audio scene can be represented by multi-channel signals aimed to be reproduced at the different loudspeaker positions, auditory objects along with metadata describing the positions of the objects over time, or a first-order or higher-order Ambisonics format representing the sound field at the listener or reference position.

Advantageously the system is based on 3GPP Enhanced Voice Services (EVS) since the solution is expected to operate with low latency to enable conversational services on mobile networks.

The encoder side of the DirAC-based spatial audio coding supporting different audio formats is illustrated in FIG. 1*b*. An acoustic/electrical input 1000 is input into an encoder interface 1010, where the encoder interface has a specific functionality for first-order Ambisonics (FOA) or high order Ambisonics (HOA) illustrated in 1013. Furthermore, the encoder interface has a functionality for multichannel (MC) data such as stereo data, 5.1 data or data having more than two or five channels. Furthermore, the encoder interface 1010 has a functionality for object coding as, for example, audio objects illustrated at 1011. The IVAS encoder comprises a DirAC stage 1020 having a DirAC analysis block 1021 and a downmix (DMX) block 1022. The signal output by block 1022 is encoded by an IVAS core encoder 1040 such as AAC or EVS encoder, and the metadata generated by block 1021 is encoded using a DirAC metadata encoder 1030.

FIG. 1*b* illustrates the encoder side of the DirAC-based spatial audio coding supporting different audio formats. As shown in FIG. 1*b*, the encoder (IVAS encoder) is capable of supporting different audio formats presented to the system separately or at the same time. Audio signals can be acoustic in nature, picked up by microphones, or electrical in nature, which are supposed to be transmitted to the loudspeakers. Supported audio formats can be multi-channel signals (MC), first-order and higher-order Ambisonics (FOA/HOA) components, and audio objects. A complex audio scene can also be described by combining different input formats. All audio formats are then transmitted to the DirAC analysis, which extracts a parametric representation of the complete audio scene. A direction-of-arrival (DOA) and a diffuseness measured per time-frequency unit form the spatial parameters or are part of a larger set of parameters. The DirAC analysis is followed by a spatial metadata encoder, which quantizes and encodes DirAC parameters to obtain a low bit-rate parametric representation.

In addition to the described channel-based, HOA-based, and object-based input formats, the IVAS encoder may receive a parametric representation of spatial sound composed of spatial and/or directional metadata and one or more associated audio input signals. The metadata can for example correspond to the DirAC metadata, i.e. DOA and diffuseness of the sound. The metadata may also include additional spatial parameters such as multiple DOAs with associated energy measures, distance or position values, or measures related to the coherence of the sound field. The associated audio input signals may be composed of a mono signal, an Ambisonics signal of first-order or higher-order, an X/Y-stereo signal, an NB-stereo signal, or any other combination of signals resulting from recordings with microphones having various directivity patterns and/or mutual spacings.

For parametric spatial audio input, the IVAS encoder determines the DirAC parameter used for transmission based on the input spatial metadata.

Along with the parameters, a down-mix (DMX) signal derived from the different sources or audio input signals is coded for transmission by a conventional audio core-coder. In this case an EVS-based audio coder is adopted for coding the down-mix signal. The down-mix signal consists of different channels, called transport channels: The signal can be e.g. the four coefficient signals composing a B-format or first-order Ambisonics (FOA) signal, a stereo pair, or a monophonic down-mix depending on the targeted bit-rate. The coded spatial parameters and the coded audio bitstream are multiplexed before being transmitted over the communication channel.

FIG. 2*a* illustrates the decoder side of the DirAC-based spatial audio coding delivering different audio formats. In the decoder, shown in FIG. 2*a*, the transport channels are decoded by the core-decoder, while the DirAC metadata is first decoded before being conveyed with the decoded transport channels to the DirAC synthesis. At this stage, different options can be considered. It can be requested to play the audio scene directly on any loudspeaker or headphone configurations as is usually possible in a conventional DirAC system (MC in FIG. 2*a*). The decoder can also deliver the individual objects as they were presented at the encoder side (Objects in FIG. 2*a*). Alternatively, it can also be requested to render the scene to Ambisonics format (FOA/HOA in FIG. 2*a*) for further manipulations, such as rotation, mirroring, or movement of the scene, or for using an external renderer not defined in the original system.

In the decoder, shown in FIG. 2*a*, the transport channels are decoded by the core-decoder, while the DirAC metadata is first decoded before being conveyed with the decoded transport channels to the DirAC synthesis. At this stage, different options can be considered. It can be requested to play the audio scene directly on any loudspeaker or headphone configurations as is usually possible in a conventional DirAC system (MC in FIG. 2*a*). The decoder can also deliver the individual objects as they were presented at the encoder side (Objects in FIG. 2*a*). Alternatively, it can also be requested to render the scene to Ambisonics format for other further manipulations, such as rotation, reflection or movement of the scene (FOA/HOA in FIG. 2*a*) or for using an external renderer not defined in the original system.

The decoder of the DirAC-spatial audio coding delivering different audio formats is illustrated in FIG. 2*a* and comprises an IVAS decoder 1045 and the subsequently connected decoder interface 1046. The IVAS decoder 1045 comprises an IVAS core-decoder 1060 that is configured in order to perform a decoding operation of content encoded by IVAS core encoder 1040 of FIG. 1*b*. Furthermore, a DirAC metadata decoder 1050 is provided that delivers the decoding functionality for decoding content encoded by the DirAC metadata encoder 1030. A DirAC synthesizer 1070 receives data from block 1050 and 1060 and using some user interactivity or not, the output is input into a decoder interface 1046 that generates FOA/HOA data illustrated at 1083, multichannel data (MC data) as illustrated in block 1082, or object data as illustrated in block 1080.

A conventional HOA synthesis using DirAC paradigm is depicted in FIG. 2*b*. An input signal called down-mix signal is time-frequency analyzed by a frequency filter bank. The frequency filter bank 2000 can be a complex-valued filterbank like Complex-valued QMF or a block transform like STFT. The HOA synthesis generates at the output an Ambisonics signal of order H containing $(H+1)^2$ components. Optionally it can also output the Ambisonics signal rendered on a specific loudspeaker layout. In the following, we will detail how to obtain the $(H+1)^2$ components from the down-mix signal accompanied in some cases by input spatial parameters.

The down-mix signal can be the original microphone signals or a mixture of the original signals depicting the original audio scene. For example if the audio scene is captured by a sound field microphone, the down-mix signal can be the omnidirectional component of the scene (W), a stereo down-mix (L/R), or the first order Ambisonics signal (FOA).

For each time-frequency tile, a sound direction, also called Direction-of-Arrival (DOA), and a diffuseness factor are estimated by the direction estimator 2020 and by the diffuseness estimator 2010, respectively, if the down-mix signal contains sufficient information for determining such DirAC parameters. It is the case, for example, if the down-mix signal is a First Oder Ambisonics signal (FOA). Alternatively or if the down-mix signal is not sufficient to determine such parameters, the parameters can be conveyed directly to the DirAC synthesis via an input bit-stream containing the spatial parameters. The bit-stream could consist for example of quantized and coded parameters received as side-information in the case of audio transmission applications. In this case, the parameters are derived outside the DirAC synthesis module from the original microphone signals or the input audio formats given to the DirAC analysis module at the encoder side as illustrated by switch 2030 or 2040.

The sound directions are used by a directional gains evaluator 2050 for evaluating, for each time-frequency tile of the plurality of time-frequency tiles, one or more set of $(H+1)^2$ directional gains $G_l^m(k,n)$, where H is the order of the synthesized Ambisonics signal.

The directional gains can be obtained by evaluation the spatial basis function for each estimated sound direction at the desired order (level) l and mode m of the Ambisonics signal to synthesize. The sound direction can be expressed for example in terms of a unit-norm vector n(k,n) or in terms of an azimuth angle φ(k,n) and/or elevation angle θ(k,n), which are related for example as:

$$n(k,n)=\begin{bmatrix}\cos\varphi(k,n)\cos\theta(k,n)\\ \sin\varphi(k,n)\cos\theta(k,n)\\ \sin\theta(k,n)\end{bmatrix}$$

After estimating or obtaining the sound direction, a response of a spatial basis function of the desired order (level) l and mode m can be determined, for example, by considering real-valued spherical harmonics with SN3D normalization as spatial basis function:

$$Y_l^m(\varphi,\theta)=N_l^{|m|}P_l^{|m|}\sin\theta\begin{cases}\sin(|m|\varphi)m & \text{if } <0\\ \cos(|m|\varphi)m & \text{if } \geq 0\end{cases}$$

with the ranges 0≤l≤H, and −l≤m≤l. $P_l^{|m|}$ are the Legendre-functions and $N_l^{|m|}$ is a normalization term for both the Legendre functions and the trigonometric functions which takes the following form for SN3D:

$$N_l^{|m|}=\sqrt{\frac{2-\delta_m}{4\pi}\frac{(l-|m|)!}{(l+|m|)!}}$$

where the Kronecker-delta $\delta_m$ is one for m=0 and zero otherwise. The directional gains are then directly deduced for each time-frequency tile of indices (k,n) as:

$$G_l^m(k,n)=Y_l^m(\varphi(k,n),\theta(k,n))$$

The direct sound Ambisonics components $P_{s,l}^m$ are computed by deriving a reference signal $P_{ref}$ from the down-mix signal and multiplied by the directional gains and a factor function of the diffuseness Ψ(k,n):

$$P_{s,l}^m(k,n)=P_{ref}(k,n)\sqrt{1-\Psi(k,n)}G_l^m(k,n)$$

For example, the reference signal $P_{ref}$ can be the omnidirectional component of the down-mix signal or a linear combination of the K channels of the down-mix signal.

The diffuse sound Ambisonics component can be modelled by using a response of a spatial basis function for sounds arriving from all possible directions. One example is to define the average response $D_l^m$ by considering the integral of the squared magnitude of the spatial basis function $Y_l^m(\varphi, \theta)$ over all possible angles φ and θ:

$$D_l^m=\int_0^{2\pi}\int_0^{\pi}|Y_l^m(\varphi,\theta)|^2\sin\theta d\theta d\varphi$$

The diffuse sound Ambisonics components $P_{d,l}^m$ are computed from a signal $P_{diff}$ multiplied by the average response and a factor function of the diffuseness Ψ(k,n):

$$P_{d,l}^m(k,n)=P_{diff,l}^m(k,n)\sqrt{\Psi(k,n)}\sqrt{D_l^m}$$

The signal $P_{diff,l}^m$ can be obtained by using different decorrelators applied to the reference signal $P_{ref}$.

Finally, the direct sound Ambisonics component and the diffuse sound Ambisonics component are combined 2060, for example, via the summation operation, to obtain the final Ambisonics component $P_l^m$ of the desired order (level) l and mode m for the time-frequency tile (k,n), i.e., $$P_l^m(k,n)=P_{s,l}^m(k,n)+P_{diff,l}^m(k,n)$$

The obtained Ambisonics components may be transformed back into the time domain using an inverse filter bank 2080 or an inverse STFT, stored, transmitted, or used for example for spatial sound reproduction applications. Alternatively, a linear Ambisonics renderer 2070 can be applied for each frequency band for obtaining signals to be played on a specific loudspeaker layout or over headphone before transforming the loudspeakers signals or the binaural signals to the time domain.

It should be noted that [Thiergart17] also taught the possibility that diffuse sound components $P_{diff,l}^m$ could only be synthesized up to an order L, where L<H. This reduces the computational complexity while avoiding synthetic artifacts due to the intensive use of decorrelators.

It is the object of the present invention to provide an improved concept for generating a sound field description from an input signal.

State-of-the-Art: DirAC Synthesis for Mono and FOA Down-Mix Signals

The common DirAC synthesis, based on a received DirAC-based spatial audio coding stream, is described in the following. The rendering performed by the DirAC synthesis is based on the decoded down-mix audio signals and the decoded spatial metadata.

The down-mix signal is the input signal of the DirAC synthesis. The signal is transformed into the time-frequency domain by a filter bank. The filter bank can be a complex-valued filter bank like complex-valued QMF or a block transform like STFT.

The DirAC parameters can be conveyed directly to the DirAC synthesis via an input bit-stream containing the spatial parameters. The bit-stream could consist for example of quantized and coded parameters received as side-information in the case of audio transmission applications.

For determining the channel signals for loudspeaker based sound reproduction, each loudspeaker signal is determined based on the down-mix signals and the DirAC parameters. The signal of the j-th loudspeaker $P_j(k,n)$ is obtained as a combination of a direct sound component and a diffuse sound component, i.e., $$P_j(k,n)=P_{dir,j}(k,n)+P_{diff,j}(k,n)$$

The direct sound component of the j-th loudspeaker channel $P_{dir,j}(k,n)$ can be obtained by scaling a so-called reference signal $P_{ref,j}(k,n)$ with a factor depending on the diffuseness parameter $\Psi(k,n)$ and a directional gain factor $G_j(v(k,n))$, where the gain factor depends on the direction-of-arrival (DOA) of sound and potentially also on the position of the j-th loudspeaker channel. The DOA of sound can be expressed for example in terms of a unit-norm vector $v(k,n)$ or in terms of an azimuth angle $\varphi(k,n)$ and/or elevation angle $\theta(k,n)$, which are related for example as $$v(k,n)=\begin{bmatrix}\cos\varphi(k,n)\cos\theta(k,n)\\ \sin\varphi(k,n)\cos\theta(k,n)\\ \sin\theta(k,n)\end{bmatrix}$$

The directional gain factor $G_j(v(k,n))$ can be computed using well-known methods such as vector-base amplitude panning (VBAP) [Pulkki97].

Considering the above, the direct sound component can be expressed by $$P_{dir,j}(k,n)=P_{ref,j}(k,n)\sqrt{1-\Psi(k,n)}G_j(v(k,n))$$

The spatial parameters describing the DOA of sound and the diffuseness are either estimated at the decoder from the transport channels or obtained from the parametric metadata included in the bitstream.

The diffuse sound component $P_{diff,j}(k,n)$ can be determined based on the reference signal and the diffuseness parameter:

$$P_{diff,j}(k,n)=P_{ref,j}(k,n)\sqrt{\Psi(k,n)}G_{norm}$$

The normalization factor $G_{norm}$ depends on the playback loudspeaker configuration. Usually, the diffuse sound components associated with the different loudspeaker channels $P_{diff,j}(k,n)$ are further processed, i.e., they are mutually decorrelated. This can also be achieved by decorrelating the reference signal for each output channel, i.e., $$P_{diff,j}(k,n)=\tilde{P}_{ref,j}(k,n)\overrightarrow{\Psi(k,n)}G_{norm},$$

where $\tilde{P}_{ref,j}(k,n)$ denotes a decorrelated version of $P_{ref,j}(k,n)$.

The reference signal for the j-th output channel is obtained based on the transmitted down-mix signals. In the simplest case, the down-mix signal consists of a monophonic omnidirectional signal (e.g. the omnidirectional component W(k,n) of an FOA signal) and the reference signal is identical for all output channels:

$$P_{ref,j}(k,n)=W(k,n)$$

If the transport channels correspond to the four components of an FOA signal, the reference signals can be obtained by a linear combination of the FOA components. Typically, the FOA signals are combined such that the reference signal of the j-th channel corresponds to a virtual cardioid microphone signal pointing to the direction of the j-th loudspeaker [Pulkki07].

The DirAC synthesis typically provides an improved sound reproduction quality for an increased number of down-mix channels, as both the required amount of synthetic decorrelation, the degree of nonlinear processing by the directional gain factors, or cross-talk between different loudspeaker channels can be reduced and associated artifacts can be avoided or mitigated.

Generally, the straightforward approach to introduce many different transport signals into the encoded audio scene is inflexible on the one hand and bitrate-consuming on the other hand. Typically, it may not be necessary in all cases to introduce, for example, all four component signals of a first order Ambisonics signal into the encoded audio signal, since one or more components do not have a significant energy contribution. On the other hand, the bitrate requirements may be tight which forbids to introduce more than two transport channels into the encoded audio signal representing a spatial audio representation. In case of such tight bitrate requirements, the encoder and the decoder would have to pre-negotiate a certain representation, and, based on this pre-negotiation, a certain amount of transport signals is generated based on a pre-negotiated way and, then, the audio decoder can synthesize the audio scene from the encoded audio signal based on the pre-negotiated knowledge. This, however, although being useful with respect to bitrate requirements, is inflexible, and additionally may amount in a significantly reduced audio quality, since the pre-negotiated procedure may not be optimum for a certain audio piece or may not be optimum for all frequency bands or for all time frames of the audio piece.

Thus, the prior art procedure of representing an audio scene is non-optimum with respect to bitrate requirements, is inflexible, and, additionally, has a high potential of resulting in a significantly reduced audio quality.

SUMMARY

An embodiment may have an apparatus for encoding a spatial audio representation representing an audio scene to acquire an encoded audio signal, the apparatus comprising: a transport representation generator for generating a transport representation from the spatial audio representation, and for generating transport metadata related to the generation of the transport representation or indicating one or more directional properties of the transport representation; and an output interface for generating the encoded audio signal, the encoded audio signal comprising information on the transport representation, and information on the transport metadata.

Another embodiment may have an apparatus for decoding an encoded audio signal, comprising: an input interface for receiving the encoded audio signal comprising information on a transport representation and information on transport metadata; and a spatial audio synthesizer for synthesizing a spatial audio representation using the information on the transport representation and the information on the transport metadata.

Another embodiment may have a method for encoding a spatial audio representation representing an audio scene to acquire an encoded audio signal, the method comprising: generating a transport representation from the spatial audio representation; generating transport metadata related to the generation of the transport representation or indicating one or more directional properties of the transport representation; and generating the encoded audio signal, the encoded audio signal comprising information on the transport representation, and information on the transport metadata.

Another embodiment may have a method for decoding an encoded audio signal, the method comprising: receiving the encoded audio signal comprising information on a transport representation and information on transport metadata; and synthesizing a spatial audio representation using the information on the transport representation and the information on the transport metadata.

Another embodiment may have a non-transitory digital storage medium having a computer program stored thereon to perform the method for encoding a spatial audio representation representing an audio scene to acquire an encoded audio signal, the method comprising: generating a transport representation from the spatial audio representation; generating transport metadata related to the generation of the transport representation or indicating one or more directional properties of the transport representation; and generating the encoded audio signal, the encoded audio signal comprising information on the transport representation, and information on the transport metadata, when said computer program is run by a computer.

Another embodiment may have a non-transitory digital storage medium having a computer program stored thereon to perform the method for decoding an encoded audio signal, the method comprising: receiving the encoded audio signal comprising information on a transport representation and information on transport metadata; and synthesizing a spatial audio representation using the information on the transport representation and the information on the transport metadata, when said computer program is run by a computer.

Another embodiment may have an encoded audio signal comprising: information on a transport representation of a spatial audio representation; and information on transport metadata.

The present invention is based on the finding that a significant improvement with respect to bitrate, flexibility and audio quality is obtained by using, in addition to a transport representation derived from the spatial audio representation, transport metadata that are related to the generation of the transport representation or that indicate one or more directional properties of the transport representation. An apparatus for encoding a spatial audio representation representing an audio scene therefore generates the transport representation from the audio scene, and, additionally, the transport metadata related to the generation of the transport representation or indicating one or more directional properties of the transport representation or being related to the generation of the transport representation and indicating one or more directional properties of the transport representation. Furthermore, an output interface generates the encoded audio signal comprising information on the transport representation and information on the transport metadata.

On the decoder-side, the apparatus for decoding the encoded audio signal comprises an interface for receiving the encoded audio signal comprising information on the transport representation and the information on the transport metadata and a spatial audio synthesizer then synthesizes the spatial audio representation using both, the information on the transport representation and the information on the transport metadata.

The explicit indication of how the transport representation such as a downmix signal has been generated and/or the explicit indication of one or more directional properties of the transport representation by means of additional transport metadata allows the encoder to generate an encoded audio scene in a highly flexible way that, on the one hand, provides a good audio quality, and on the other hand, fulfills small bitrates requirements. Additionally, by means of the transport metadata, it is even possible for the encoder to find a required optimum balance between bitrate requirements on the one hand and audio quality represented by the encoded audio signal on the other hand. Thus, the usage of explicit transport metadata allows the encoder to apply different ways of generating the transport representation and to additionally adapt the transport representation generation not only from audio piece to audio piece, but even from one audio frame to the next audio frame or, within one and the same audio frame from one frequency band to the other frequency band. Naturally, the flexibility is obtained by generating the transport representation for each time/frequency tile individually so that, for example, the same transport representation can be generated for all frequency bins within a time frame or, alternatively, the same transport representation can be generated for one and the same frequency band over many audio time frames, or an individual transport representation can be generated for each frequency bin of each time frame. All this information, i.e., the way of generating the transport representation and whether the transport representation is related to a full frame, or only to a time/frequency bin or a certain frequency band over many time frames is also included in the transport metadata so that a spatial audio synthesizer is aware of what has been done at the encoder-side and can then apply the optimum procedure at the decoder-side.

Advantageously, certain transport metadata alternatives are selection information indicating which components of a certain set of components representing the audio scene have been selected. A further transport metadata alternative relates to a combination information, i.e., whether and/or how certain component signals of the spatial audio representation have been combined to generate the transport representation. Further information useful as transport metadata relates to sector/hemisphere information indicating to which sector or hemisphere a certain transport signal or a transport channel relates to. Further, metadata useful in the context of the present invention relate to look direction information indicating a look direction of an audio signal included as the transport signal of, advantageously, a plurality of different transport signals in the transport representation. Other look direction information relates to microphone look directions, when the transport representation consists of one or more microphone signals that can, for example, be recorded by physical microphones in a (spatially extended) microphone array or by coincident microphones or, alternatively, these microphone signals can be synthetically generated. Other transport metadata relate to shape parameter data indicating whether a microphone signal is an omnidirectional signal, or has a different shape such as a cardioid shape or a dipole shape. Further transport metadata relate to locations of microphones in case of having more than one microphone signal within the transport representation. Other useful transport metadata relate to orientation data of the one or more microphones, to distance data indicating a distance between two microphones or directional patterns of the microphones. Furthermore, additional transport metadata may relate to a description or identification of a microphone array such as a circular microphone array or which microphone signals from such a circular microphone array have been selected as the transport representation.

Further transport metadata may relate to information on beamforming, corresponding beamforming weights or corresponding directions of beams and, in such a situation, the transport representation typically consists of a advantageously synthetically created signal having a certain beam direction. Further transport metadata alternatives may relate to the pure information whether the included transport signals are omnidirectional microphone signals or are non-omnidirectional microphone signals such as cardioid signals or dipole signals.

Thus, it becomes clear that the different transport metadata alternatives are highly flexible and can be represented in a highly compact way so that the additional transport metadata typically do not result in a significant amount of additional bitrate. Instead, the bitrate requirements for the additional transport metadata may typically be as small as less than 1% or even less than 1/1000 or even smaller of the amount for the transport representation. On the other hand, however, this very small amount of additional metadata results in a higher flexibility, and at the same time, a significant increase of audio quality due to the additional flexibility and due to the potential of having changing transport representations over different audio pieces or, even within one and the same audio piece over different time frames and/or frequency bins.

Advantageously, the encoder additionally comprises a parameter processor for generating spatial parameters from the spatial audio representation so that, in addition to the transport representation and the transport metadata, spatial parameters are included in the encoded audio signal to enhance the audio quality over a quality only obtainable by means of the transport representation and the transport metadata. These spatial parameters are advantageously time and/or frequency-dependent direction of arrival (DoA) data and/or frequency and/or time-dependent diffuseness data as are, for example, known from DirAC coding.

On the audio decoder-side, an input interface receives the encoded audio signal comprising information on a transport representation and information on transport metadata. Furthermore, the spatial audio synthesizer provided in the apparatus for decoding the encoded audio signal synthesizes the spatial audio representation using both, the information on the transport representation and the information on the transport metadata. In embodiments, the decoder additionally uses optionally transmitted spatial parameters to synthesize the spatial audio representation not only using the information on the transport metadata and the information on the transport representation, but also using the spatial parameters.

The apparatus for decoding the encoded audio signal receives the transport metadata, interprets or parses the received transport metadata, and then controls a combiner for combining transport representation signals or for selecting from the transport representation signals or for generating one or several reference signals. The combiner/selector/reference signal generator then forwards the reference signal to a component signal calculator that calculates the required output components from the specifically selected or generated reference signals. In embodiments, not only the combiner/selector/reference signal generator as in the spatial audio synthesizer is controlled by the transport metadata, but also the component signal calculator so that, based on the received transport data, not only the reference signal generation/selection is controlled, but also the actual component calculation. However, embodiments in which only the component signal calculation is controlled by the transport metadata or only the reference signal generation or selection is only controlled by the transport metadata are also useful and provide improved flexibility over existing solutions.

Advantageous procedures of different signal selection alternatives are selecting one of a plurality of signals in the transport representation as a reference signal for a first subset of component signals and selecting the other transport signal in the transport representation for the other orthogonal subset of the component signals for multichannel output, first order or higher order Ambisonics output, audio object output, or binaural output. Other procedures rely on calculating the reference signal based on a linear combination of the individual signals included in the transport representation. Depending on the certain transport representation implementation, the transport metadata is used for determining a reference signal for (virtual) channels from the actually transmitted transport signals and determining missing components based on a fallback, such as a transmitted or generated omnidirectional signal component. These procedures rely on calculating missing, advantageously FOA or HOA components using a spatial basis function response related to a certain mode and order of a first order or higher order Ambisonics spatial audio representation.

Other embodiments relate to transport metadata describing microphone signals included in the transport representation, and, based on the transmitted shape parameter and/or look direction, a reference signal determination is adapted to the received transport metadata. Furthermore, the calculation of omnidirectional signals or dipole signals and the additional synthesis of remaining components is also performed based on the transport metadata indicating, for example, that the first transport channel is a left or front cardioid signal, and the second transport signal is a right or back cardioid signal.

Further procedures relate to the determination of reference signals based on a smallest distance of a certain speaker to a certain microphone position or the selection, as a reference signal, of a microphone signal included in the transport representation with a closest look direction or a closest beamformer or a certain closest array position. A further procedure is the choosing of an arbitrary transport signal as a reference signal for all direct sound components and the usage of all available transport signals such as transmitted omnidirectional signals from spaced microphones for the generation of diffuse sound reference signals and the corresponding components are then generated by adding direct and diffuse components to obtain a final channel or Ambisonics component or an object signal or a binaural channel signal. Further procedures that are particularly implemented in the calculation of the actual component signal based on a certain reference signal relate in the setting (advantageously restricting) an amount of correlation based on a certain microphone distance.

BRIEF DESCRIPTION OF THE DRAWINGS

Embodiments of the present invention will be detailed subsequently referring to the appended drawings, in which.

DETAILED DESCRIPTION OF THE INVENTION

Figure 6:
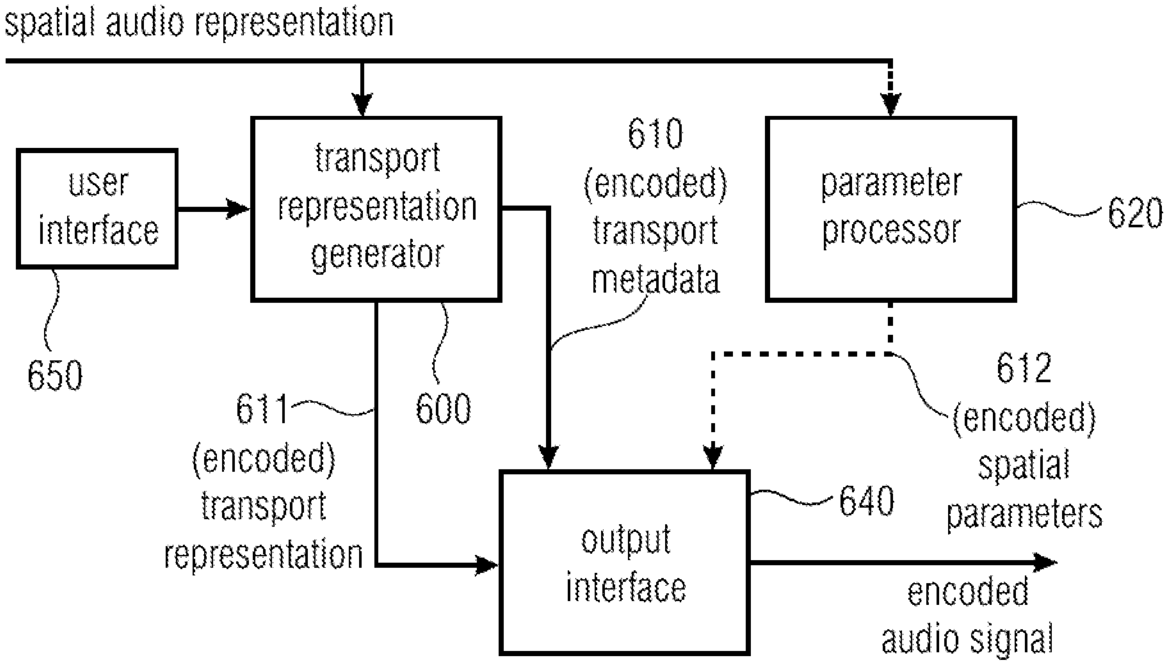
FIG. 6 illustrates a further embodiment of an apparatus for encoding a spatial audio representation.

FIG. 6 illustrates an apparatus for encoding a spatial audio representation representing an audio scene. The apparatus comprises a transport representation generator 600 for generating a transport representation from the spatial audio representation. Furthermore, the transport representation generator 600 generates transport metadata related to the generation of the transport representation or indicating one or more directional properties of the transport representation. The apparatus additionally comprises an output interface 640 for generating the encoded audio signal, where the encoded audio signal comprises information on the transport representation and information on the transport metadata. In addition to the transport representation generator 600 and the output interface 640, the apparatus advantageously comprises a user interface 650 and a parameter processor 620. The parameter processor 620 is configured for deriving spatial parameters from the spatial audio representation and advantageously provides (encoded) spatial parameter 612. Furthermore, in addition to the (encoded) spatial parameter 612, the (encoded) transport metadata 610 and the (encoded) transport representation 611 are forwarded to the output interface 640 to advantageously multiplex the three encoded items into the encoded audio signal.

Figure 7:
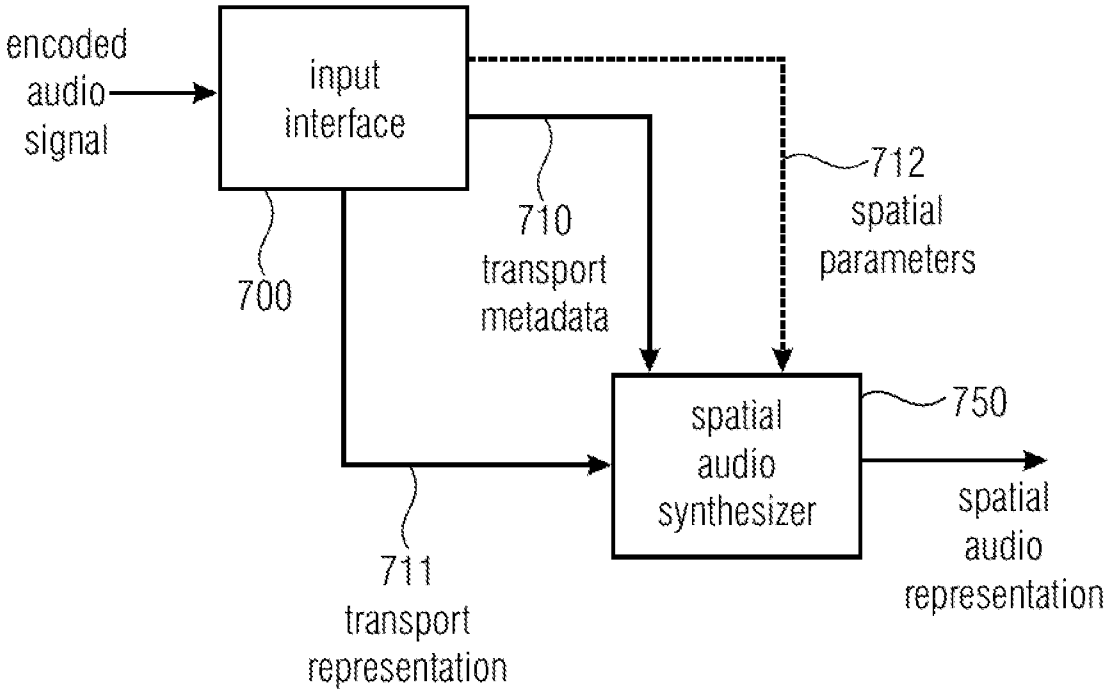
FIG. 7 illustrates a further embodiment of an apparatus for decoding an encoded audio signal.

FIG. 7 illustrates an implementation of an apparatus for decoding an encoded audio signal. The encoded audio signal is input into an input interface 700 and the input interface receives, within the encoded audio signal, information on the transport representation and information on transport metadata. The transport representation 711 is forwarded, from the input interface 700, to a spatial audio synthesizer 750. Furthermore, the spatial audio synthesizer 750 receives transport metadata 710 from the input interface and, if included in the encoded audio signal, advantageously, additionally the spatial parameter 712. The spatial audio synthesizer 750 uses items 710, 711 and, advantageously, additionally item 712 in order to synthesize the spatial audio representation.

Figure 1A:
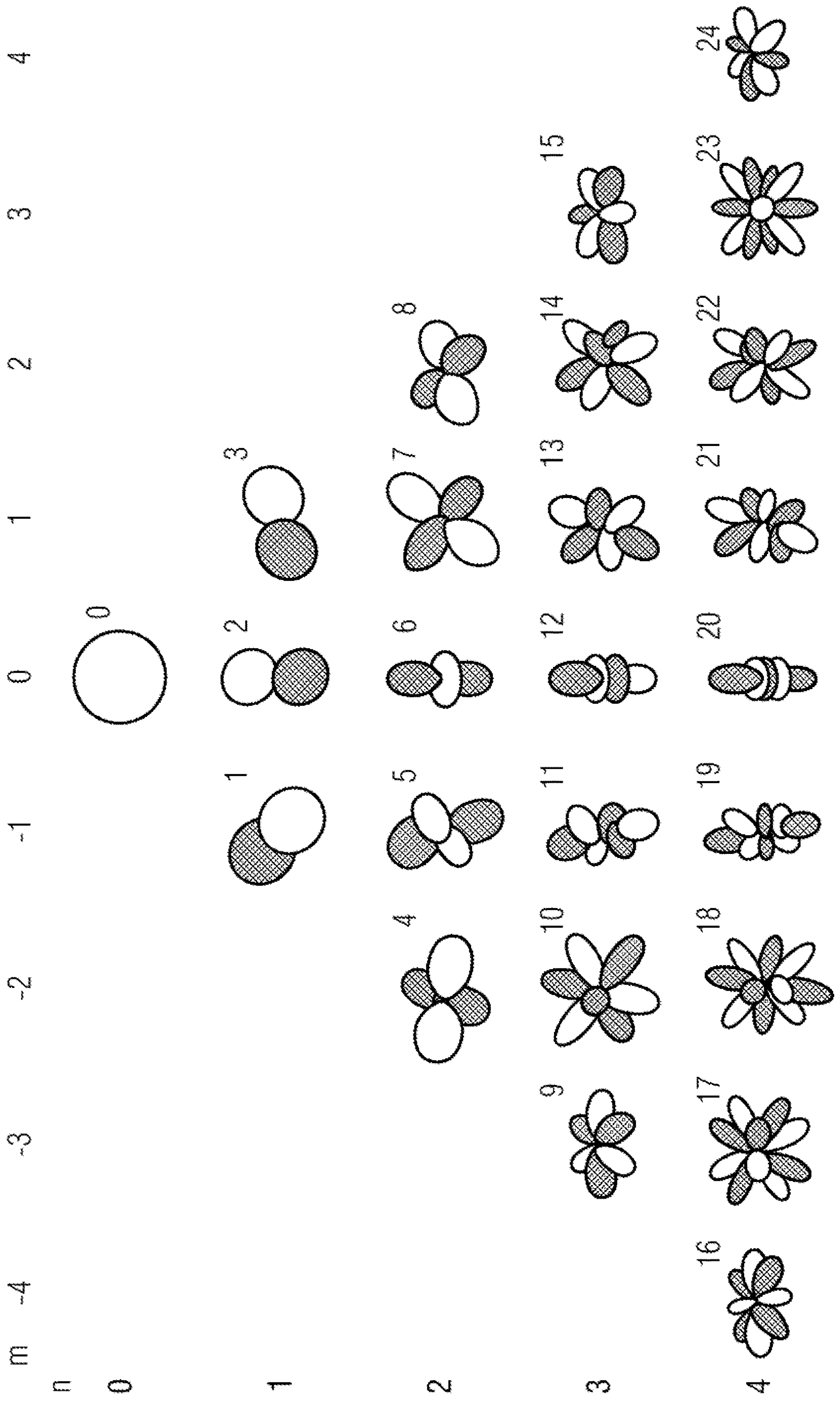
FIG. 1*a* illustrates spherical harmonics with Ambisonics channel/component numbering.
Figure 1B:
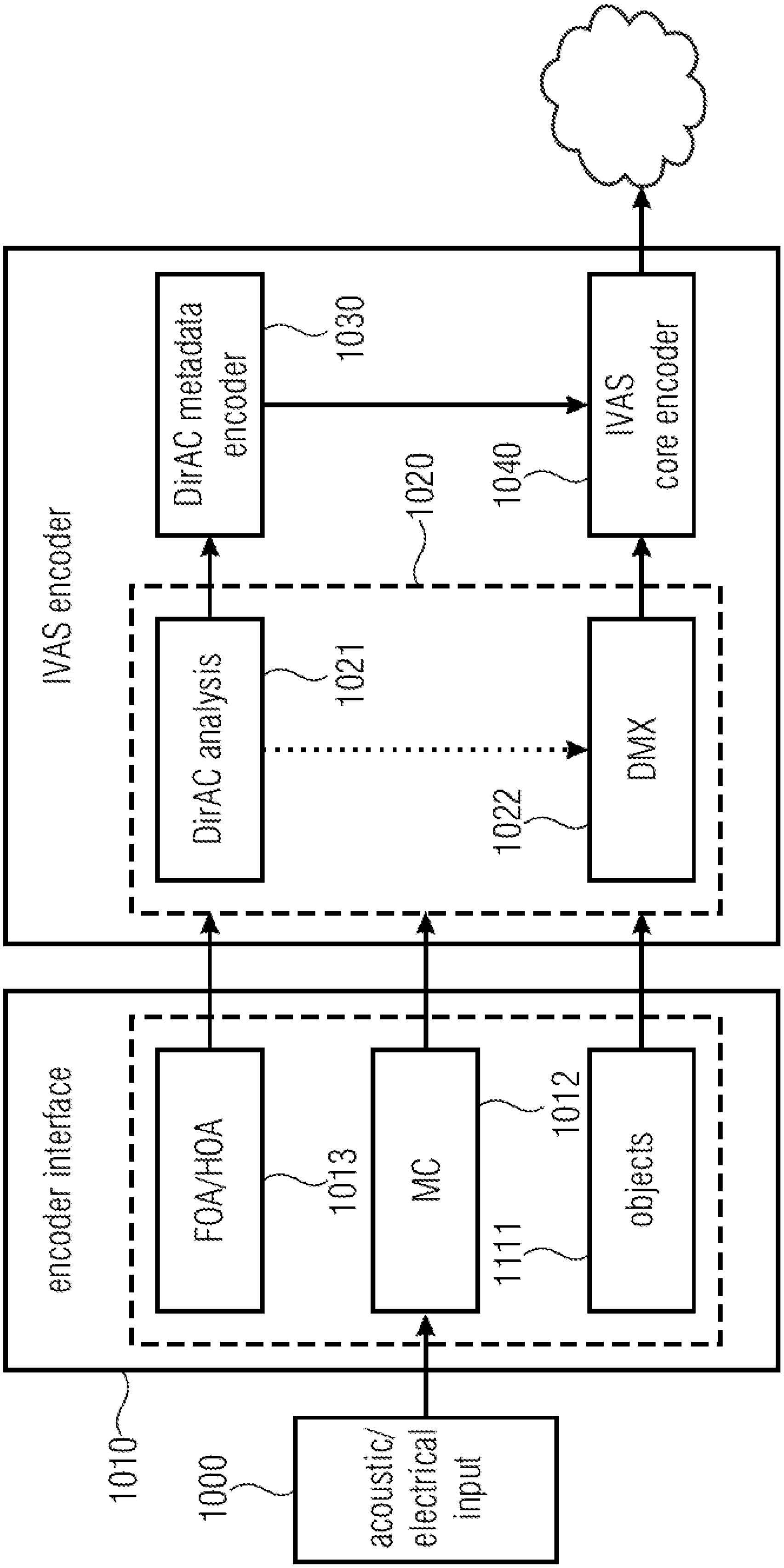
FIG. 1*b* illustrates an encoder side of a DirAC-based spatial audio coding processor.
Figure 2A:
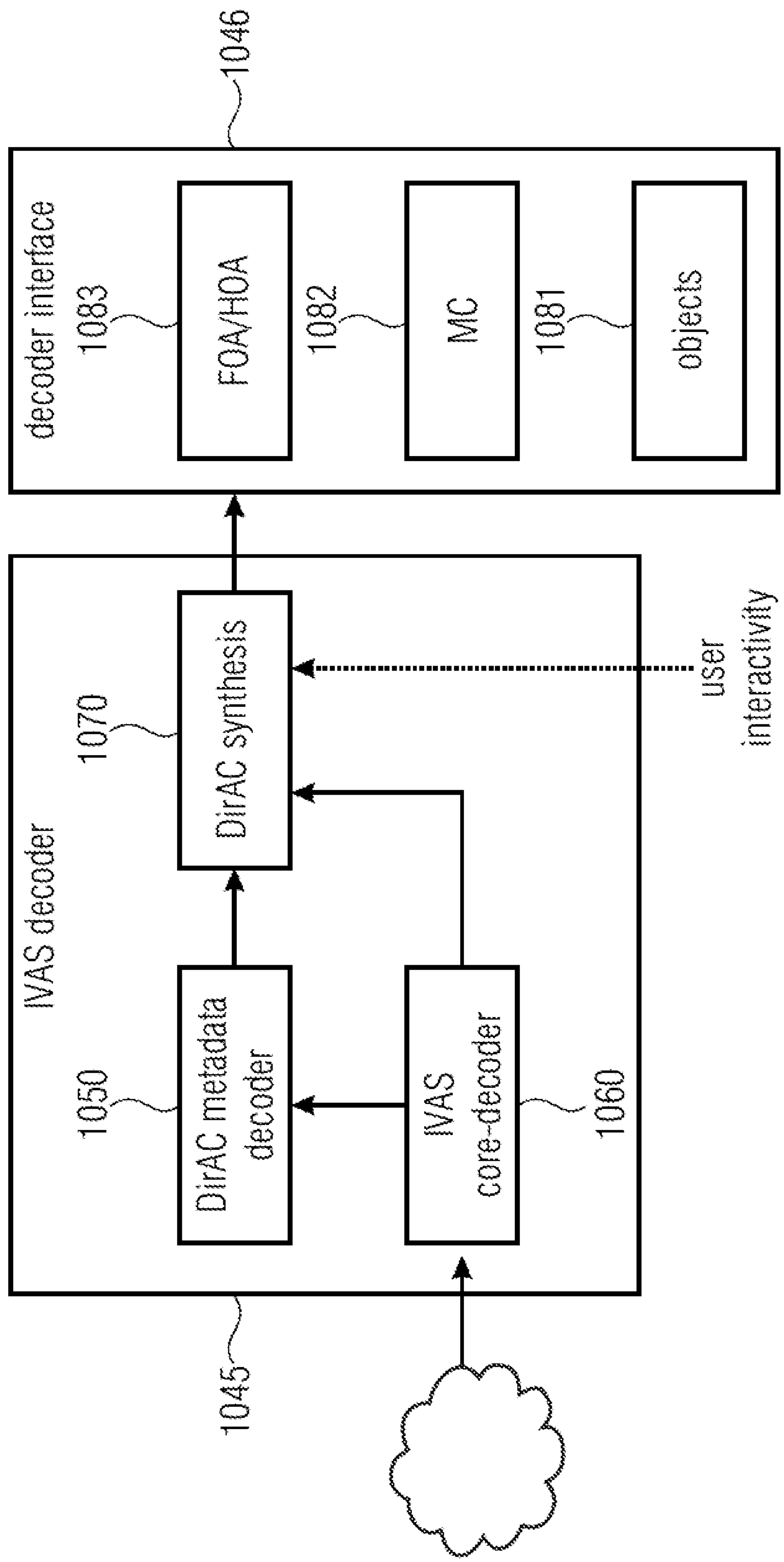
FIG. 2*a* illustrates a decoder of the DirAC-based spatial audio coding processor.
Figure 2B:
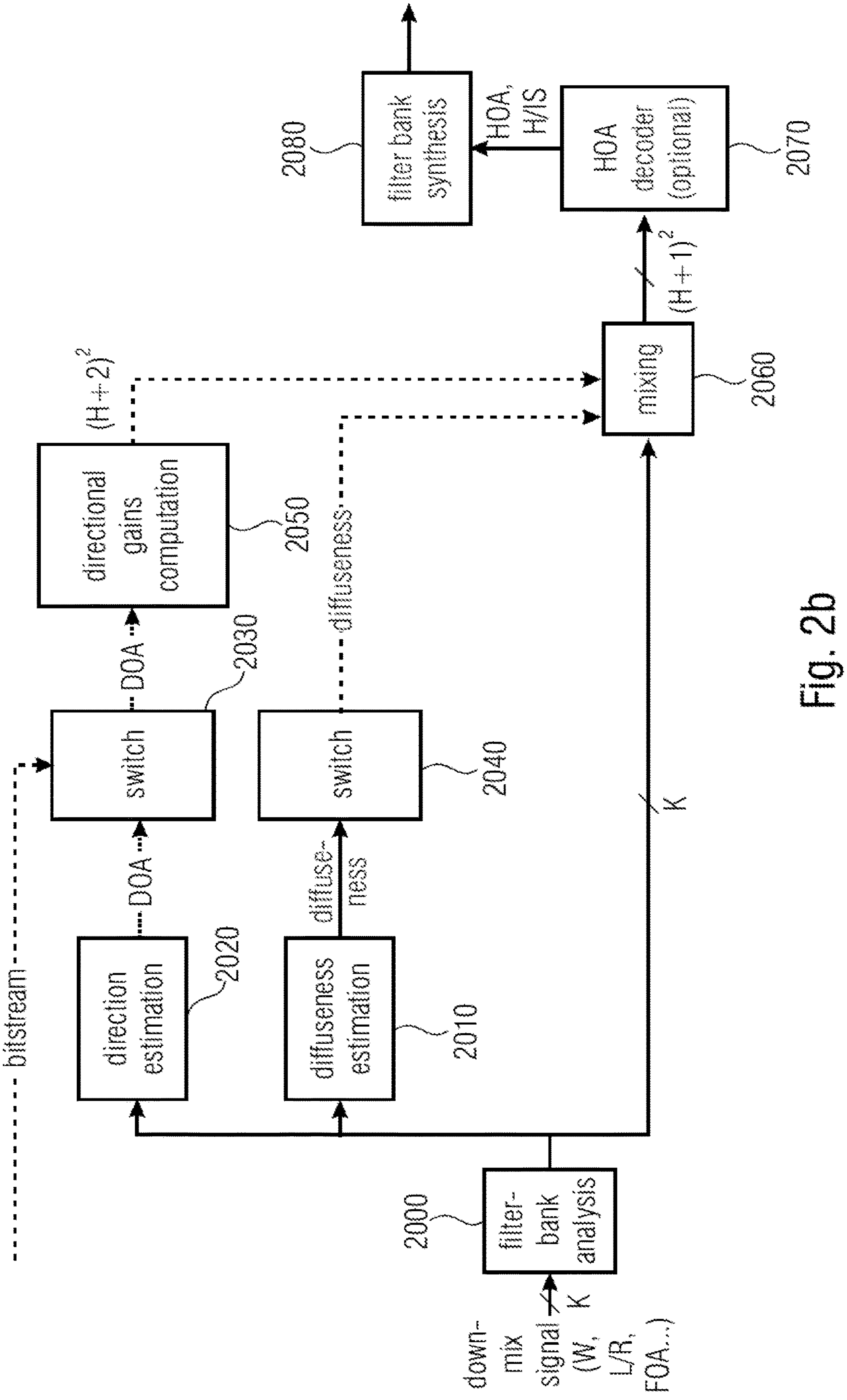
FIG. 2*b* illustrates a high order Ambisonics synthesis processor known from the art.
Figure 3:
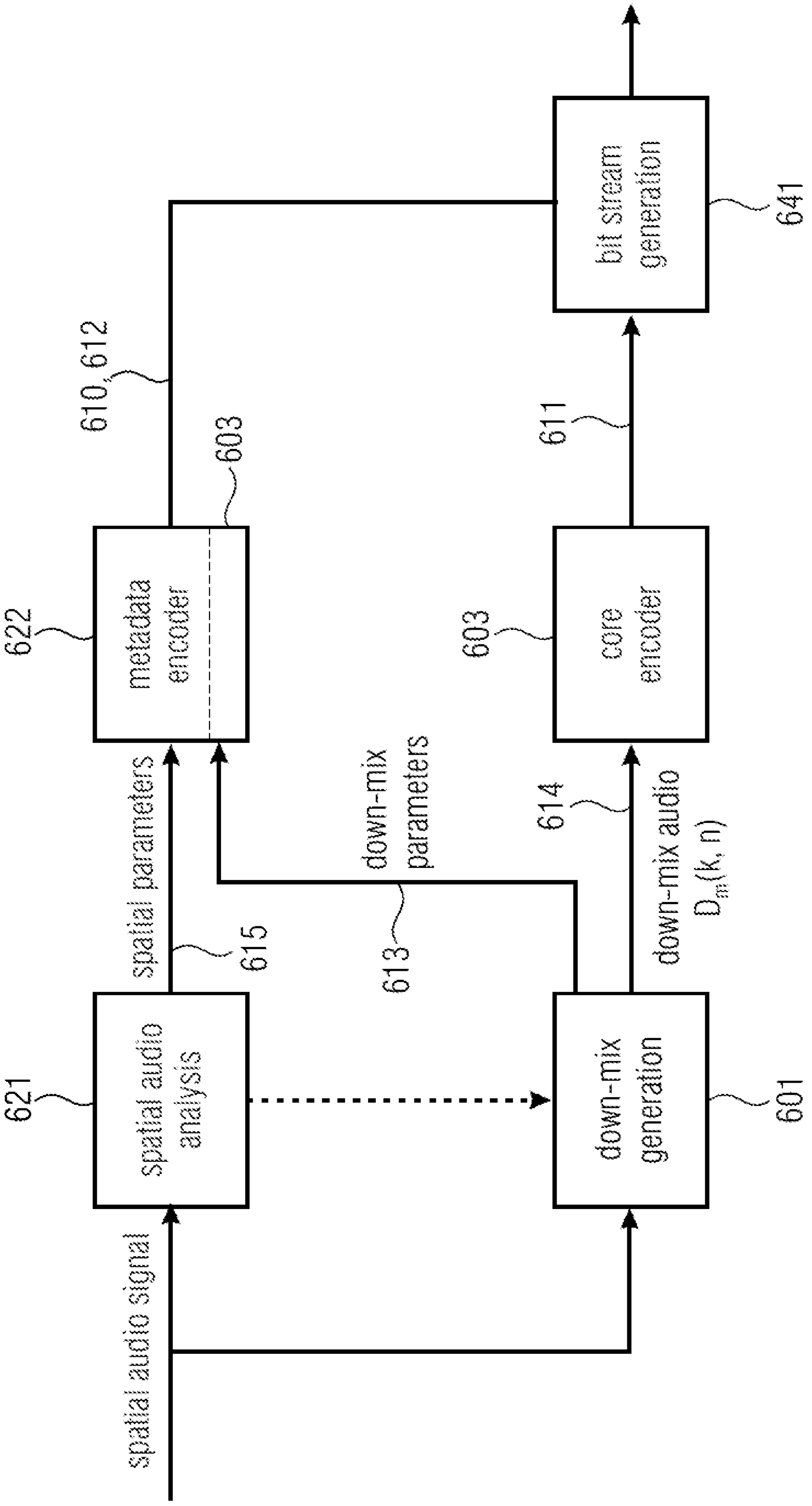
FIG. 3 illustrates an encoder-side of the Dirac-based spatial audio coding supporting different audio formats.

FIG. 3 illustrates an implementation of the apparatus for encoding a spatial audio representation indicated as a spatial audio signal in FIG. 3. In particular, the spatial audio signal is input into a down-mix generation block 610 and into a spatial audio analysis block 621. The spatial parameters 615 derived from the spatial audio analysis block 621 from the spatial audio signal are input into a metadata encoder 622. Furthermore, the down-mix parameters 630 generated by the downmix generation block 601 are also input into a metadata encoder 603. Both the metadata encoder 621 and the metadata encoder 603 are indicated as a single block in FIG. 3 but can also be implemented as separate blocks. The downmix audio signal 640 is input into a core encoder 603 and the core-encoded representation 611 is input into the bit stream generator 641 that additionally receives the encoded downmix parameters 610 and the encoded spatial parameters 612. Thus, the transport representation generator 600 illustrated in FIG. 6 comprises, in the embodiment of FIG. 3, the downmix generation block 601 and the core encoder block 603. Furthermore, the parameter processor 620 illustrated in FIG. 6 comprises the spatial audio analyzer block 621 and the metadata encoder block 622 for the spatial parameter 615. Furthermore, the transport representation generator 600 of FIG. 6 additionally comprises the metadata encoder block 603 for the transport metadata 630 that are output as the encoded transport metadata 610 by the metadata encoder 603. The output interface 640 is, in the embodiment of FIG. 3, implemented as a bit stream generator 641.

Figure 4:
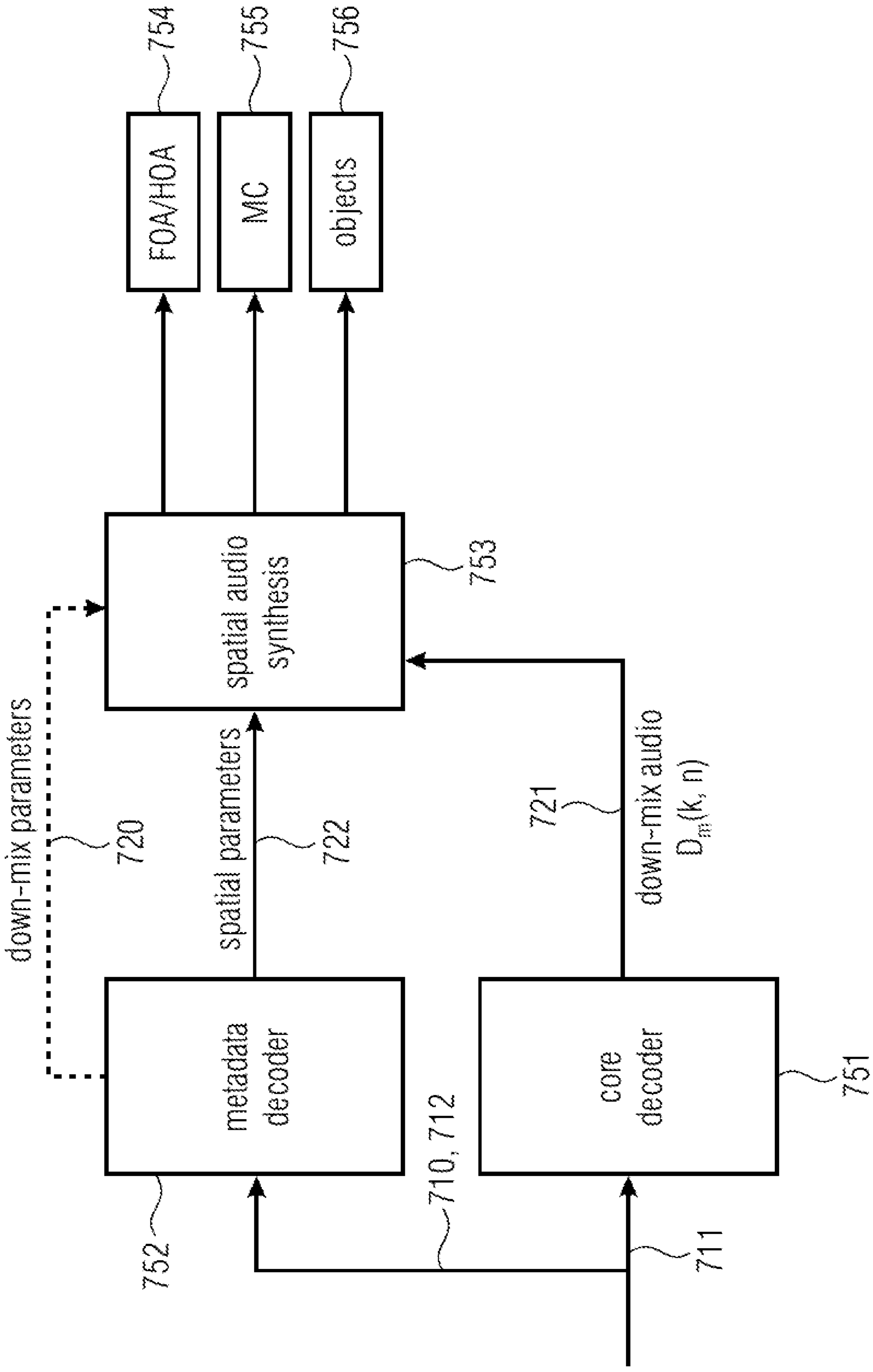
FIG. 4 illustrates the decoder-side of the Dirac-based spatial audio coding delivering different audio formats.

FIG. 4 illustrates an implementation of an apparatus for decoding an encoded audio signal. In particular, the apparatus comprises a metadata decoder 752 and a core decoder 751. The metadata decoder 752 receives, as an input, the encoded transport metadata 710 and the core decoder 751 receives the encoded transport representation 711. Furthermore, the metadata decoder 752 advantageously receives, when available, encoded spatial parameters 712. The metadata decoder decodes the transport metadata 710 to obtain downmix parameter 720, and the metadata decoder 752 advantageously decodes the encoded spatial parameters 712 to obtain decoded spatial parameter 722. The decoded transport representation or down-mix audio representation 721 together with the transport metadata 720 are input into a spatial audio synthesis block 753 and, additionally, the spatial audio synthesis block 753 may receive a spatial parameter 722 in order to use the two components 721 and 720 or all three components 721, 720 and 722 to generate the spatial audio representation comprising in a first order or higher order (FOA/HOA) representation 754 or comprising a multichannel (MC) representation 755 or comprising an object representation (objects) 756 as illustrated in FIG. 4. Thus, the apparatus for decoding the encoded audio signal illustrated in FIG. 7 comprises, within the spatial audio synthesizer 750, block 752, 751 and 753 of FIG. 4, and the spatial audio representation may comprise one of the alternatives illustrated at 754, 755 and 756 of FIG. 4.

Figure 5:
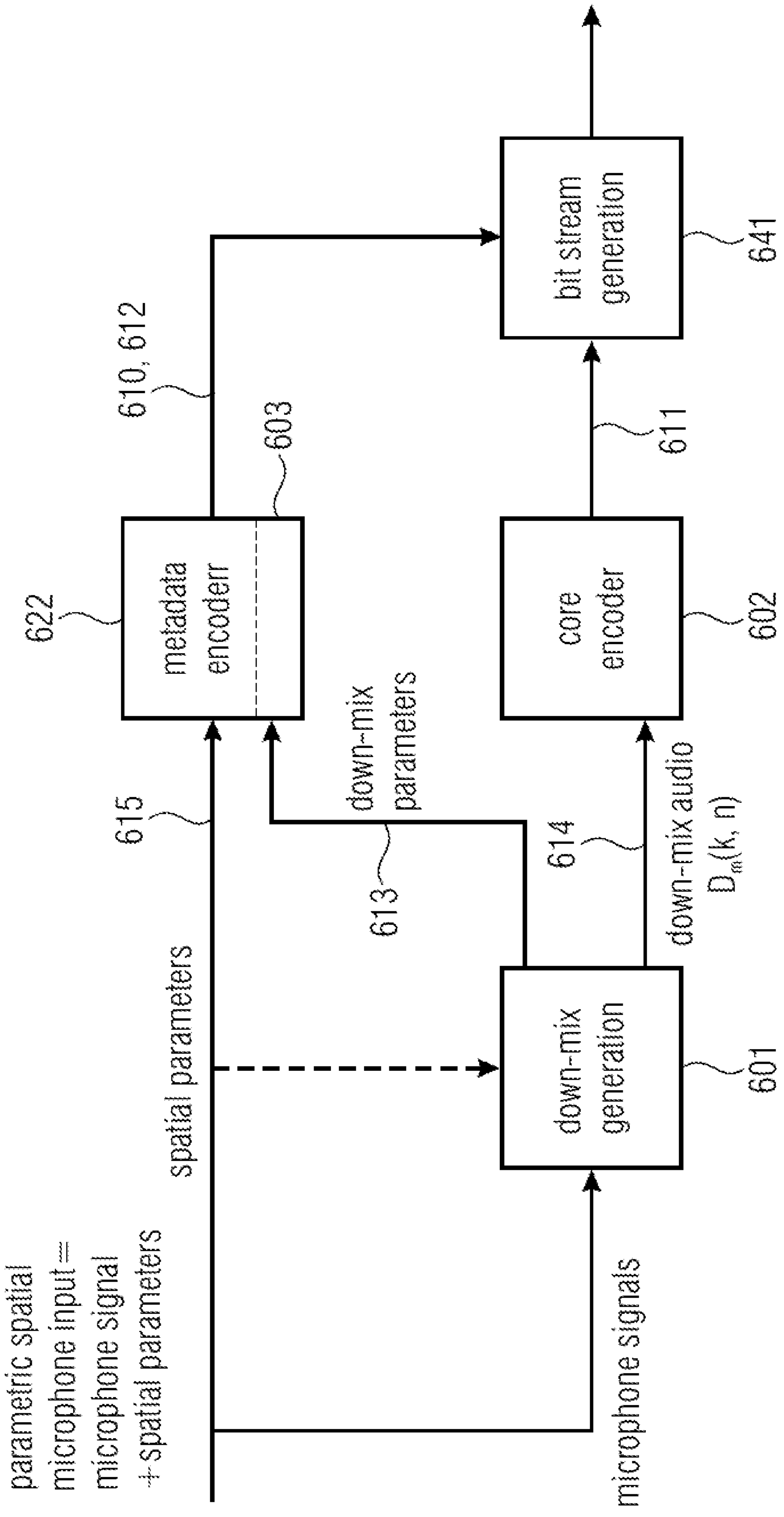
FIG. 5 illustrates a further embodiment of an apparatus for encoding a spatial audio representation.

FIG. 5 illustrates a further implementation of the apparatus for encoding a spatial audio representation representing an audio scene. Here, the spatial audio representation representing the audio scene is provided as microphone signals and, advantageously, additional spatial parameters associated with the microphone signals. Thus, the transport representation 600 discussed with respect to FIG. 6 comprises, in the FIG. 5 embodiment, the downmix generation block 601, the metadata encoder 603 for the down-mix parameters 613 and the core encoder 602 for the down-mix audio representation. In contrast to the FIG. 3 embodiment, the spatial audio analyzer block 621 is not included in the apparatus for encoding, since the microphone input already has, advantageously in a separated form, the microphone signals on the one hand and the spatial parameters on the other hand.

In the embodiments discussed with respect to FIGS. 3 to 5, the down-mix audio 614 represents the transport representation, and the down-mix parameters 613 represent an alternative of the transport metadata that are related to the generation of the transport representation or that, as will be outlined later on, indicate one or more directional properties of the transport representation.

Embodiments of the Invention: Down-Mix Signaling for Flexible Transport Channel Configuration In some applications it is not possible to transmit all four components of an FOA signal as transport channels due to bitrate limitations, but only a down-mix signal with reduced number of signal components or channels. In order to achieve improved reproduction quality at the decoder, the generation of the transmitted down-mix signals can be done in a time-variant way and can be adapted to the spatial audio input signal. If the spatial audio coding system allows to include flexible down-mix signals, it is important to not only transmit these transport channels but in addition include metadata that specifies important spatial characteristics of the down-mix signals. The DirAC synthesis located at the decoder of a spatial audio coding system is then able to adapt the rendering process in an optimum way considering the spatial characteristics of the down-mix signals. This invention therefore proposes to include down-mix related metadata in the parametric spatial audio coding stream that is used to specify or describe important spatial characteristics of the down-mix transport channels in order to improve the rendering quality at the spatial audio decoder.

In the following, illustrative examples for practical down-mix signal configurations are described.

If the input spatial audio signal mainly includes sound energy in the horizontal plane, only the first three signal components of the FOA signal corresponding to an omnidirectional signal, a dipole signal aligned with the x-axis and a dipole signal aligned with the y-axis of a Cartesian coordinate system are included in the down-mix signal, whereas the dipole signal aligned with the z-axis is excluded.

In another example, only two down-mix signals may be transmitted to further reduce the required bitrate for the transport channels. For example, if there is dominant sound energy originating from the left hemisphere, it is advantageous to generate a down-mix channel that includes sound energy mainly from the left direction and an additional down-mix channel including the sound originating mainly from the opposite direction, i.e. the right hemisphere in this example. This can be achieved by a linear combination of the FOA signal components such that the resulting signals correspond to directional microphone signals with cardioid directivity patterns pointing to the left and right, respectively. Analogously, down-mix signals corresponding to first-order directivity patterns pointing to the front and back direction, respectively, or any other desired directional patterns can be generated by appropriately combining the FOA input signals.

In the DirAC synthesis stage, the computation of the loudspeaker output channels based on the transmitted spatial metadata (e.g. DOA of sound and diffuseness) and the audio transport channels has to be adapted to the actually used down-mix configuration. More specifically, the most suitable choice for the reference signal of the j-th loudspeaker $P_{ref,j}(k,n)$ depends on the directional characteristic of the down-mix signals and the position of the j-th loudspeaker.

For example, if the down-mix signals correspond to two cardioid microphone signals pointing to the left and right, respectively, the reference signal of a loudspeaker located in the left hemisphere should solely use the cardioid signal pointing to the left as reference signal $P_{ref,j}(k,n)$. A loudspeaker located at the center may use a linear combination of both down-mix signal instead.

On the other hand, if the down-mix signals correspond to two cardioid microphone signals pointing to the front and back, respectively, the reference signal of a loudspeaker located in the frontal hemisphere should solely use the cardioid signal pointing to the front as reference signal $P_{ref,j}(k,n)$.

It is important to note that a significant degradation of the spatial audio quality has to be expected if the DirAC synthesis uses a wrong down-mix signal as the reference signal for rendering. For example, if the down-mix signal corresponding to the cardioid microphone pointing to the left is used for generating an output channel signal for a loudspeaker located in the right hemisphere, the signal components originating from the left hemisphere of the input sound field would be directed mainly to the right hemisphere of the reproduction system leading to an incorrect spatial image of the output. It is therefore advantageous to include parametric information in the spatial audio coding stream that specifies spatial characteristics of the down-mix signals such as directivity patterns of corresponding directional microphone signals. The DirAC synthesis located at the decoder of a spatial audio coding system is then able to adapt the rendering process in an optimum way considering the spatial characteristics of the down-mix signals as described in the down-mix related metadata.

Flexible Down-Mix for FOA and HOA Audio Input Using Ambisonics Component Selection In this embodiment, the spatial audio signal, i.e., the audio input signal to the encoder, corresponds to an FOA (first-order Ambisonics) or HOA (higher-order Ambisonics) audio signal. A corresponding block scheme of the encoder is depicted in FIG. 3. Input to the encoder is the spatial audio signal, e.g., the FOA or HOA signal. In the “spatial audio analysis” block, the DirAC parameters, i.e., spatial parameters (e.g., DOA and diffuseness), are estimated as explained before. The down-mix signals of the proposed flexible down-mix are generated in the “down-mix generation”

block, which is explained below in more detail. The generated down-mix signals are referred to as $D_m(k,n)$, where m is the index of the down-mix channel. The generated down-mix signal is then encoded in the "core encoder" block, e.g., using an EVS-based audio coder as explained before. The down-mix parameters, i.e., the parameters that describe the relevant information about how the down-mix was created or other directional properties of the down-mix signal, are encoded in the metadata encoder together with the spatial parameters. Finally, the encoded metadata and encoded down-mix signals are transformed into a bit stream, which can be sent to the decoder.

In the following, the "down-mix generation" block and down-mix parameters are explained in more detail. If for example the input spatial audio signal mainly includes sound energy in the horizontal plane, only the three signal components of the FOA/HOA signal corresponding to the omnidirectional signal W(k,n), the dipole signal X(k,n) aligned with the x-axis, and the dipole signal Y(k,n) aligned with the y-axis of a Cartesian coordinate system are included in the down-mix signal, whereas the dipole signal Z(k,n) aligned with the z-axis (and all other higher-order components, if existing) are excluded. This means, the down-mix signals are given by $$D_1(k,n)=W(k,n), D_2(k,n)=X(k,n), D_3(k,n)=Y(k,n).$$

Alternatively, if for example the input spatial audio signal mainly includes sound energy in the x-z-plane, the down-mix signals include the dipole signal Z(k,n) instead of Y(k,n).

In this embodiment, the down-mix parameters, depicted in FIG. 3, contain the information which FOA/HOA components have been included in the down-mix signals. This information can be, for example, a set of integer numbers corresponding to the indices of the selected FOA components, e.g., {1,2,4} if the W(k,n), X(k,n), and Z(k,n) components are included.

Note that the selection of the FOA/HOA components for the down-mix signal can be done e.g. based on manual user input or automatically. For example, when the spatial audio input signal was recorded at an airport runway, it can be assumed that most sound energy is contained in a specific vertical Cartesian plane. In this case, e.g. the W(k,n), X(k,n) and Z(k,n) components are selected. In contrast, if the recording was carried out at a street crossing, it can be assumed that most sound energy is contained in the horizontal Cartesian plane. In this case, e.g. the W(k,n), X(k,n) and Y(k,n) components are selected. Alternatively, if for example a video camera is used together with the audio recording, a face recognition algorithm can be used to detect in which Cartesian plane the talker is located and hence, the FOA components corresponding to this plane can be selected for the down-mix. Alternatively, one can determine the plane of the Cartesian coordinate system with highest energy by using a state-of-the-art acoustic source localization algorithm.

Also note that the FOA/HOA component selection and corresponding down-mix metadata can be time and frequency-dependent, e.g., a different set of components and indices, respectively, may be selected automatically for each frequency band and time instance (e.g., by automatically determining the Cartesian plane with highest energy for each time-frequency point). Localizing the direct sound energy can be done for example by exploiting the information contained in the time-frequency dependent spatial parameters [Thiergart09].

The decoder block scheme corresponding to this embodiment is depicted in FIG. 4. Input to the decoder is a bitstream containing encoded metadata and encoded down-mix audio signals. The down-mix audio signals are decoded in the "core decoder" and the metadata is decoded in the "metadata decoder". The decoded metadata consists of the spatial parameters (e.g., DOA and diffuseness) and the down-mix parameters. The decoded down-mix audio signals and spatial parameters are used in the "spatial audio synthesis" block to create the desired spatial audio output signals, which can be e.g. FOA/HOA signals, multi-channel (MC) signals (e.g., loudspeaker signals), audio objects or binaural stereo output for headphone playback. The spatial audio synthesis additionally is controlled by the down-mix parameters, as explained in the following.

The spatial audio synthesis (DirAC synthesis) described before requires a suited reference signal $P_{ref,j}(k,n)$ for each output channel j. In this invention, it is proposed to compute $P_{ref,j}(k,n)$ from the down-mix signals $D_m(k,n)$ using the additional down-mix metadata. In this embodiment, the down-mix signals $D_m(k,n)$ consist of specifically selected components of an FOA or HOA signal, and the down-mix metadata describes which FOA/HOA components have been transmitted to the decoder.

When rendering to loudspeakers (i.e., MC output of the decoder), a high-quality output can be achieved when computing for each loudspeaker channel a so-called virtual microphone signal, which is directed towards the corresponding loudspeaker, as explained in [Pulkki07]. Normally, computing the virtual microphone signals requires that all FOA/HOA components are available in the DirAC synthesis. In this embodiment, however, only a subset of the original FOA/HOA components is available at the decoder. In this case, the virtual microphone signals can be computed only for the Cartesian plane, for which the FOA/HOA components are available, as indicated by the down-mix metadata. For example, if the down-mix metadata indicates that the W(k,n), X(k,n), and Y(k,n) component have been transmitted, we can compute the virtual microphone signals for all loudspeakers in the x-y plane (horizontal plane), where the computation can be performed as described in [Pulkki07]. For elevated loudspeakers outside the horizontal plane, we can use a fallback solution for the reference signal $P_{ref,j}(k,n)$, e.g., we can use the omnidirectional component W(k,n).

Note that a similar concept can be used when rendering to binaural stereo output, e.g., for headphone playback. In this case, the two virtual microphones for the two output channels are directed towards the virtual stereo loudspeakers, where the position of the loudspeakers depends on the head orientation of the listener. If the virtual loudspeakers are located within the Cartesian plane, for which the FOA/HO components have been transmitted as indicated by the down-mix metadata, we can compute the corresponding virtual microphone signals. Otherwise, a fallback solution is used for the reference signal $P_{ref,j}(k,n)$, e.g., the omnidirectional component W(k,n).

When rendering to FOA/HOA (FOA/HOA output of the decoder in FIG. 4), the down-mix metadata is used as follows: The down-mix metadata indicates which FOA/HOA components have been transmitted. These components do not need to be computed in the spatial audio synthesis, since the transmitted components can directly be used at the decoder output. All remaining FOA/HOA components are computed in the spatial sound synthesis, e.g., by using the omnidirectional component W(k,n) as the reference signal $P_{ref,j}(k,n)$. The synthesis of FOA/HOA components from an omnidirectional component W(k,n) using spatial metadata is described for example in [Thiergart17].

Flexible Down-Mix for FOA and HOA Audio Input Using Combined Ambisonics Components In this embodiment, the spatial audio signal, i.e., the audio input signal to the encoder, corresponds to an FOA (first-order Ambisonics) or HOA (higher-order Ambisonics) audio signal. A corresponding block scheme of the encoder and is depicted in FIG. 3 and FIG. 4, respectively. In this embodiment, only two down-mix signals may be transmitted from the encoder to the decoder to further reduce the required bitrate for the transport channels. For example, if there is dominant sound energy originating from the left hemisphere, it is advantageous to generate a down-mix channel that includes sound energy mainly from the left hemisphere and an additional down-mix channel including the sound originating mainly from the opposite direction, i.e., the right hemisphere in this example. This can be achieved by a linear combination of the FOA or HOA audio input signal components such that the resulting signals correspond to directional microphone signals with, e.g., cardioid directivity patterns pointing to the left and right hemisphere, respectively. Analogously, down-mix signals corresponding to first-order (or higher-order) directivity patterns pointing to the front and back direction, respectively, or any other desired directional patterns can be generated by appropriately combining the FOA or HOA audio input signals, respectively.

The down-mix signals are generated in the encoder in the "down-mix generation" block in FIG. 3. The down-mix signals are obtained from a linear combination of the FOA or HOA signal components. For example, in case of FOA audio input signals, the four FOA signal components correspond to an omnidirectional signal W(k,n) and three dipole signals X(k,n), Y(k,n), and Z(k,n) with the directivity patterns being aligned with the x-, y-, z-axis of the Cartesian coordinate system. These four signals are commonly referred to as B-format signals. The resulting directivity patterns, which can be obtained by a linear combination of the four B-format components, are typically referred to as first-order directivity patterns. First-order directivity patterns or the corresponding signals can be expressed in different ways. For example, the m-th down-mix signal $D_m(k,n)$ can be expressed by the linear combination of the B-format signals with associated weights, i.e., $$D_m(k,n)=a_{m,W}W(k,n)+a_{m,X}X(k,n)+a_{m,Y}Y(k,n)+a_{m,Z}Z(k,n).$$

Note that in case of HOA audio input signals, the linear combination can be performed similarly using the available HOA coefficients. The weights for the linear combination, i.e., the weights $a_{m,W}$, $a_{m,X}$, $a_{m,Y}$, and $a_{m,Z}$ in this example, determine the directivity pattern of the resulting directional microphone signal, i.e., of the m-th down-mix signal $D_m(k,n)$. In case of FOA audio input signals, the desired weights for the linear combination can be computed as $$a_{m,W} = c_m$$

$$[\,a_{m,X} \quad a_{m,Y} \quad a_{m,Z}\,]^T = (1-c_m)w_m$$

Where $$w_m = \begin{bmatrix} \cos\Phi_m\cos\Theta_m \\ \sin\Phi_m\cos\Theta_m \\ \sin\Theta_m \end{bmatrix}.$$

Here, $c_m$ is the so-called first-order parameter or shape parameter and $\Phi_m$ and $\Theta_m$ are the desired azimuth angle and elevation angle of the look direction of the generated m-th directional microphone signal. For example, for $c_m=0.5$, a directional microphone with cardioid directivity is achieved, $c_m=1$ corresponds to an omnidirectional characteristic $c_m=0$ corresponds to a dipole characteristic. In other words, the parameter $c_m$ describes the general shape of the first-order directivity pattern.

The weights for the linear combination, e.g., $a_{m,W}$, $a_{m,X}$, $a_{m,Y}$, and $a_{m,Z}$, or the corresponding parameters $c_m$, $\Phi_m$, and $\Theta_m$, describe the directivity patterns of the corresponding directional microphone signals. This information is represented by the down-mix parameters in the encoder in FIG. 3 and is transmitted to the decoder as part of the metadata.

Different encoding strategies can be used to efficiently represent the down-mix parameters in the bitstream including quantization of the directional information or referring to a table entry by an index, where the table includes all relevant parameters.

In some embodiments it is already sufficient or more efficient to use only a limited number of presets for the look directions $\Phi_m$ and $\Theta_m$ as well as for the shape parameter $c_m$. This obviously corresponds to using a limited number of presets for the weights $a_{m,W}$, $a_{m,X}$, $a_{m,Y}$, and $a_{m,Z}$, too. For example, the shape parameters can be limited to represent only three different directivity patterns: omnidirectional, cardioid, and dipole characteristic. The number of possible look directions $\Phi_m$ and $\Theta_m$ can be limited such that they only represent the cases left, right, front, back, up, and down.

In another even simpler embodiment, the shape parameter is kept fixed and corresponds to a cardioid pattern or the shape parameter is not defined at all. The down-mix parameters associated with the look direction are used to signal whether a pair of downmix-channels correspond to a left/right or a front/back channel pair configuration such that the rendering process at the decoder can use the optimum down-mix channel as reference signal for rendering a certain loudspeaker channel located in the in the left, right or frontal hemisphere.

In the practical application, the parameter $c_m$ can be defined, e.g., manually (typically $c_m=0.5$). The look directions $\Phi_m$ and $\Theta_m$ can be set automatically (e.g., by localizing the active sound sources using a state-of-the-art sound source localization approach and directing the first down-mix signal towards the localized source and the second down-mix signal towards the opposite direction).

Note that similarly as in the previous embodiment, the down-mix parameters can be time-frequency dependent, i.e., a different down-mix configuration may be used for each time and frequency (e.g., when directing the down-mix signals depending on the active source direction localized separately in each frequency band). The localization can be done for example by exploiting the information contained in the time-frequency dependent spatial parameters [Thiergart09].

In the "spatial audio synthesis" stage in the decoder in FIG. 4, the computation of the decoder output signals (FOA/HOA output, MC output, or Objects output), which uses the transmitted spatial parameters (e.g. DOA of sound and diffuseness) and the down-mix audio channels $D_m(k,n)$ as described before, has to be adapted to the actually used down-mix configuration, which is specified by the down-mix metadata.

For example, when generating loudspeaker output channels (MC output), the computation of the reference signals $P_{ref,j}(k,n)$ has to be adapted to the actually used down-mix configuration. More specifically, the most suitable choice for the reference signal $P_{ref,j}(k,n)$ of the j-th loudspeaker depends on the directional characteristic of the down-mix signals (e.g., its look direction) and the position of the j-th loudspeaker. For example, if the down-mix metadata indicates that the down-mix signals correspond to two cardioid microphone signals pointing to the left and right, respectively, the reference signal of a loudspeaker located in the left hemisphere should mainly or solely use the cardioid down-mix signal pointing to the left as reference signal $P_{ref,j}(k,n)$. A loudspeaker located at the center may use a linear combination of both down-mix signals instead (e.g., a sum of the two down-mix signals). On the other hand, if the down-mix signals correspond to two cardioid microphone signals pointing to the front and back, respectively, the reference signal of a loudspeaker located in the frontal hemisphere should mainly or solely use the cardioid signal pointing to the front as reference signal $P_{ref,j}(k,n)$.

When generating FOA or HOA output in the decoder in FIG. 4, the computation of the reference signal $P_{ref,j}(k,n)$ also has to be adapted to the actually used down-mix configuration, which is described by the down-mix metadata. For example, if the down-mix metadata indicates that the down-mix signals correspond to two cardioid microphone signals pointing to the left and right, respectively, the reference signal $P_{ref,1}(k,n)$ for synthesizing the first FOA component (omnidirectional component) can be computed as the sum of the two cardioid down-mix signals, i.e., $$P_{ref,1}(k,n)=D_1(k,n)+D_2(k,n).$$

In fact, it is known that the sum of two cardioid signals with opposite look direction leads to an omnidirectional signal. In this case, $P_{ref,1}(k,n)$ directly results in the first component of the desired FOA or HOA output signal, i.e., no further spatial sound synthesis is required for this component. Similarly, the third FOA component (dipole component in y-direction) can be computed as the difference of the two cardioid down-mix signals, i.e., $$P_{ref,3}(k,n)=D_1(k,n)-D_2(k,n).$$

In fact, it is known that the difference of two cardioid signals with opposite look direction leads to a dipole signal. In this case, $P_{ref,3}(k,n)$ directly results in the third component of the desired FOA or HOA output signal, i.e., no further spatial sound synthesis is required for this component. All remaining FOA or HOA components may be synthesized from an omnidirectional reference signal, which contains audio information from all directions. This means, in this example the sum of the two down-mix signals is used for the synthesis of the remaining FOA or HOA components. If the down-mix metadata indicates a different directivity of the two audio down-mix signals, the computation of the reference signals $P_{ref,j}(k,n)$ can be adjusted accordingly. For example, if the two cardioid audio down-mix signals are directed towards the front and back (instead of left and right), the difference of the two down-mix signals can be used to generate the second FOA component (dipole component in x-direction) instead of the third FOA component. In general, as shown by the examples above, the optimal reference signal $P_{ref,j}(k,n)$ can be found by a linear combination of the received down-mix audio signals, i.e., $$P_{ref,j}(k,n)=A_{1,j}D_1(k,n)+A_{2,j}D_2(k,n)$$

where the weights $A_{1,j}$ and the $A_{2,j}$ of the linear combination depend on the down-mix metadata, i.e., on the transport channel configuration and the considered j-th reference signal (e.g. when rendering to the j-th loudspeaker).

Note that the synthesis of FOA or HOA components from an omnidirectional component using spatial metadata is described for example in [Thiergart17].

In general, it is important to note that a significant degradation of the spatial audio quality has to be expected if the spatial audio synthesis uses a wrong down-mix signal as the reference signal for rendering. For example, if the down-mix signal corresponding to the cardioid microphone pointing to the left is used for generating an output channel signal for a loudspeaker located in the right hemisphere, the signal components originating from the left hemisphere of the input sound field would be directed mainly to the right hemisphere of the reproduction system leading to an incorrect spatial image of the output.

Flexible Down-Mix for Parametric Spatial Audio Input

In this embodiment, the input to the encoder corresponds to a so-called parametric spatial audio input signal, which comprises the audio signals of an arbitrary array configuration consisting of two or more microphones together with spatial parameters of the spatial sound (e.g., DOA and diffuseness).

The encoder for this embodiment is depicted in FIG. 5. The microphone array signals are used to generate one or more audio down-mix signals in the “down-mix generation” block. The down-mix parameters, which describe the transport channel configuration (e.g. how the down-mix signals were computed or some of their properties), together with the spatial parameters represent the encoder metadata, which is encoded in the “metadata encoder” block. Note that usually no spatial audio analysis step is required for parametric spatial audio input (in contrast to the previous embodiments), since the spatial parameters are already provided as input to the encoder. Note, however, that the spatial parameters of the parametric spatial audio input signal and the spatial parameters included in the bitstream for transmission generated by the spatial audio encoder do not have to be identical. In this case a transcoding or mapping of the input spatial parameters and the ones used for transmission has to be performed at the encoder. The down-mix audio signals are encoded in the “core encoder” block, e.g., using an EVS-based audio codec. The encoded audio down-mix signals and encoded metadata form the bitstream that is transmitted to the decoder. For the decoder, the same block scheme in FIG. 4 applies as for the previous embodiments.

In the following, it is described how the audio down-mix signals and corresponding down-mix metadata can be generated.

In a first example, the audio down-mix signals are generated by selecting a subset of the available input microphone signals. The selection can be done manually (e.g., based on presets) or automatically. For example, if the microphone signals of a uniform circular array with M spaced omnidirectional microphones are used as input to the spatial audio encoder and two audio down-mix transport channels are used for transmission, a manual selection could consist e.g. of selecting a pair of signals corresponding to the microphones at the front and at the back of the array, or a pair of signals corresponding to the microphones at the left and right side of the array. Selecting the front and back microphone as down-mix signals enables a good discrimination between frontal sounds and sounds from the back when synthesizing the spatial sound at the decoder. Similarly, selecting the left and right microphone would enable a good discrimination of spatial sounds along the y-axis when rendering the spatial sound at the decoder side. For example, if a recorded sound source is located at the left side of the microphone array, there is a difference in the timeof-arrival of the source's signal at the left and right microphone, respectively. In other words, the signal reaches the left microphone first, and then the right microphone. At the rendering process at the decoder, it is therefore also important to use the down-mix signal associated with the left microphone signal for rendering to loudspeakers located in the left hemisphere and analogously to use the down-mix signal associated with the right microphone signal for rendering to loudspeakers located in the right hemisphere. Otherwise, the time differences included in the left and right down-mix signals, respectively, would be directed to loudspeakers in an incorrect way and the resulting perceptual cues caused by the loudspeaker signals are incorrect, i.e. the perceived spatial audio image by a listener would be incorrect, too. Analogously, it is important to be able at the decoder to distinguish between down-mix channels corresponding to front and back or up and down in order to achieve optimum rendering quality.

The selection of the appropriate microphone signals can be done by considering the Cartesian plane that contains most of the acoustic energy, or which is expected to contain most relevant sound energy. To carry out an automatic selection, one can perform e.g. a state-of-the-art acoustic source localization, and then select the two microphones that are closest to the axis corresponding to the source direction. A similar concept can be applied e.g. if the microphone array consists of M coincident directional microphones (e.g., cardioids) instead of spaced omnidirectional microphones. In this case, one can could select the two directional microphones that are oriented in the direction and in the opposite direction of the Cartesian axes that contains (or is expected to contain) most acoustic energy.

In this first example, the down-mix metadata contains the relevant information on the selected microphones. This information can contain for example the microphone positions of the selected microphones (e.g., in terms of absolute or relative coordinates in a Cartesian coordinate system) and/or inter-microphone distances and/or the orientation (e.g., in terms of coordinates in the polar coordinate system, i.e., in terms of an azimuth and elevation angle $\Phi_m$ and $\Theta_m$). Additionally, the down-mix metadata may comprise information on the directivity pattern of the selected microphones, e.g., by using the first-order parameter $c_m$ described before.

On the decoder side (FIG. 4), the down-mix metadata is used in the "spatial audio synthesis" block to obtain optimum rendering quality. For example, for loudspeaker output (MC output), when the down-mix metadata indicates that two omnidirectional microphones at two specific positions were transmitted as down-mix signals, the reference signal $P_{ref,j}(k,n)$, from which the loudspeaker signal is generated as explained before, can be selected to correspond to the down-mix signals that has the smallest distance to the j-th loudspeaker position. Similarly, if the down-mix metadata indicates that two directional microphones with look direction $\{\Phi_m, \Theta_m\}$ were transmitted, $P_{ref,j}(k,n)$ can be selected to correspond to the down-mix signal with closest look direction towards the loudspeaker position. Alternatively, a linear combination of the transmitted coincident directional down-mix signals can be performed, as explained in the second embodiment.

When generating FOA/HOA output at the decoder, a single down-mix signal may be selected (at will) for generating the direct sound for all FOA/HOA components if the down-mix metadata indicates that spaced omnidirectional microphones have been transmitted. In fact, each omnidirectional microphone contains the same information on the direct sound to be reproduced due to the omnidirectional characteristic. However, for generating the diffuse sound reference signals $\tilde{P}_{ref,j}$, one can consider all transmitted omnidirectional down-mix signals. In fact, if the sound field is diffuse, the spaced omnidirectional down-mix signals will be partially decorrelated such that less decorrelation is required to generate mutually uncorrelated reference signals $\tilde{P}_{ref,j}$. The mutually uncorrelated reference signals can be generated from the transmitted down-mix audio signals by using e.g. the covariance-based rendering approach proposed in [Vilkamo13].

It is well-known that the correlation between the signals of two microphones in a diffuse sound field strongly depends on the distance between the microphones: the larger the distance of the microphones the less the recorded signals in a diffuse sound field are correlated [Laitinen11]. The information related to the microphone distance included in the down-mix parameters can be used at the decoder to determine by how much the down-mix channels have to be synthetically decorrelated to be suitable for rendering diffuse sound components. In case of the down-mix signals are already sufficiently decorrelated due to sufficiently large microphone spacings, artificial decorrelation may even be discarded and any decorrelation related artifacts can be avoided.

When the down-mix metadata indicates that e.g. coincident directional microphone signals have been transmitted as downmix signals, then the reference signals $P_{ref,j}(k,n)$ for FOA/HOA output can be generated as explained in the second embodiment.

Note that instead of selecting a subset of microphones as down-mix audio signals in the encoder, one could select all available microphone input signal (for example two or more) as down-mix audio signal. In this case, the down-mix metadata describes the entire microphone array configuration, e.g., in terms of Cartesian microphone positions, microphone look directions $\Phi_m$ and $\Theta_m$ in polar coordinates, or microphone directivities in terms of first-order parameters $c_m$.

In a second example, the down-mix audio signals are generated in the encoder in the "down-mix generation" block using a linear combination of the input microphone signals, e.g., using spatial filtering (beamforming). In this case, the down-mix signals $D_m(k,n)$ can be computed as $$D_m(k,n)=w_m^H x(k,n)$$

Here, x(k,n) is a vector containing all input microphone signals and $w_m^H$ are the weights for the linear combination, i.e., the weights of the spatial filter or beamformer, for the m-th audio down-mix signal. There are various ways to compute spatial filters or beamformers in an optimal way [Veen88]. In many cases, a look direction $\{\Phi_m, \Theta_m\}$ is defined, towards which the beamformer is directed. The beamformer weights can then be computed, e.g., as a delay-and-sum beamformer or MVDR beamformer [Veen88]. In this embodiment, the beamformer look direction $\{\Phi_m, \Theta_m\}$ is defined for each audio down-mix signal. This can be done manually (e.g., based on presets) or automatically in the same ways as described in the second embodiment. The look direction $\{\Phi_m, \Theta_m\}$ of the beamformer signals, which represent the different audio down-mix signals, then can represents the down-mix metadata that is transmitted to the decoder in FIG. 4.

Another example is especially suitable when using loudspeaker output at the decoder (MC output). In this case, that down-mix signal $D_m(k,n)$ is used as $P_{ref,j}(k,n)$ for which the beamformer look direction is closest to the loudspeaker direction. The required beamformer look direction is described by the down-mix metadata.

Note that in all examples, the transport channel configuration, i.e., down-mix parameters, can be adjusted time-frequency dependent, e.g., based on the spatial parameters, similarly as in the previous embodiments.

Subsequently, further embodiments of the present invention or the embodiments already described before are discussed with respect to the same or additional or further aspects.

Figure 8A:
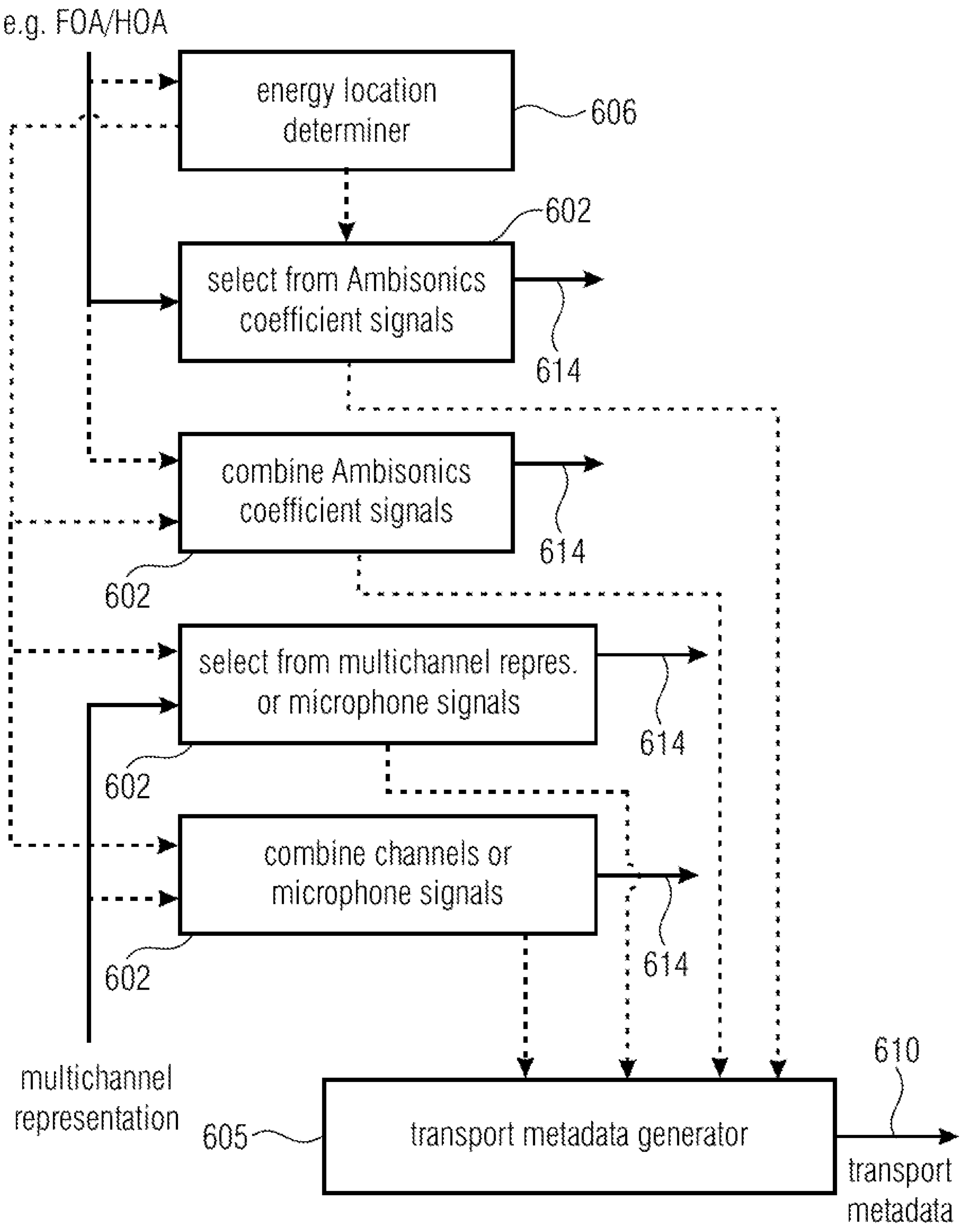
FIG. 8*a* illustrates a set of implementations for the transport representation generator usable individually of each other or together with each other.

Advantageously, the transport representation generator 600 of FIG. 6 comprises one or several of the features illustrated in FIG. 8*a*. Particularly, an energy location determiner 606 is provided that controls a block 602. The block 602 may comprise a selector for selecting from Ambisonics coefficient signals when the input is an FOA or HOA signal. Alternatively, or additionally, the energy location determiner 606 controls a combiner for combining Ambisonics coefficient signals. Additionally, or alternatively, a selection from a multichannel representation or from microphone signals is done. In this case, the input has microphone signals or a multichannel representation rather than FOA or HOA data. In additional or alternatively, a channel combination or a combination of microphone signals is performed as indicated at 602 in FIG. 8*a*. For the lower two alternatives, the multichannel representation or microphone signals are input.

The transport data generated by one or several of the blocks 602 are input into the transport metadata generator 605 included in the transport representation generator 600 of FIG. 6 in order to generate the (encoded) transport metadata 610.

Any one of the blocks 602 generates the advantageously non-encoded transport representation 614 that is then further encoded by a core encoder 603 such as the one illustrated in FIG. 3 or FIG. 5.

It is outlined that an actual implementation of the transport representation generator 600 may comprise only a single one of the blocks 602 in FIG. 8*a* or two or more of the blocks illustrated in FIG. 8*a*. In the latter case, the transport metadata generator 605 is configured to additionally include a further transport metadata item into the transport metadata 610 that indicates for which (time and/or frequency) portion of the spatial audio representation any one of the alternatives indicated at item 602 has been taken. Thus, FIG. 8*a* illustrates a situation where only one of the alternatives 602 is active or where two or more are active and a signal-dependent switch can be performed among the different alternatives for the transport representation generation or downmixing and the corresponding transport metadata.

Figure 8B:
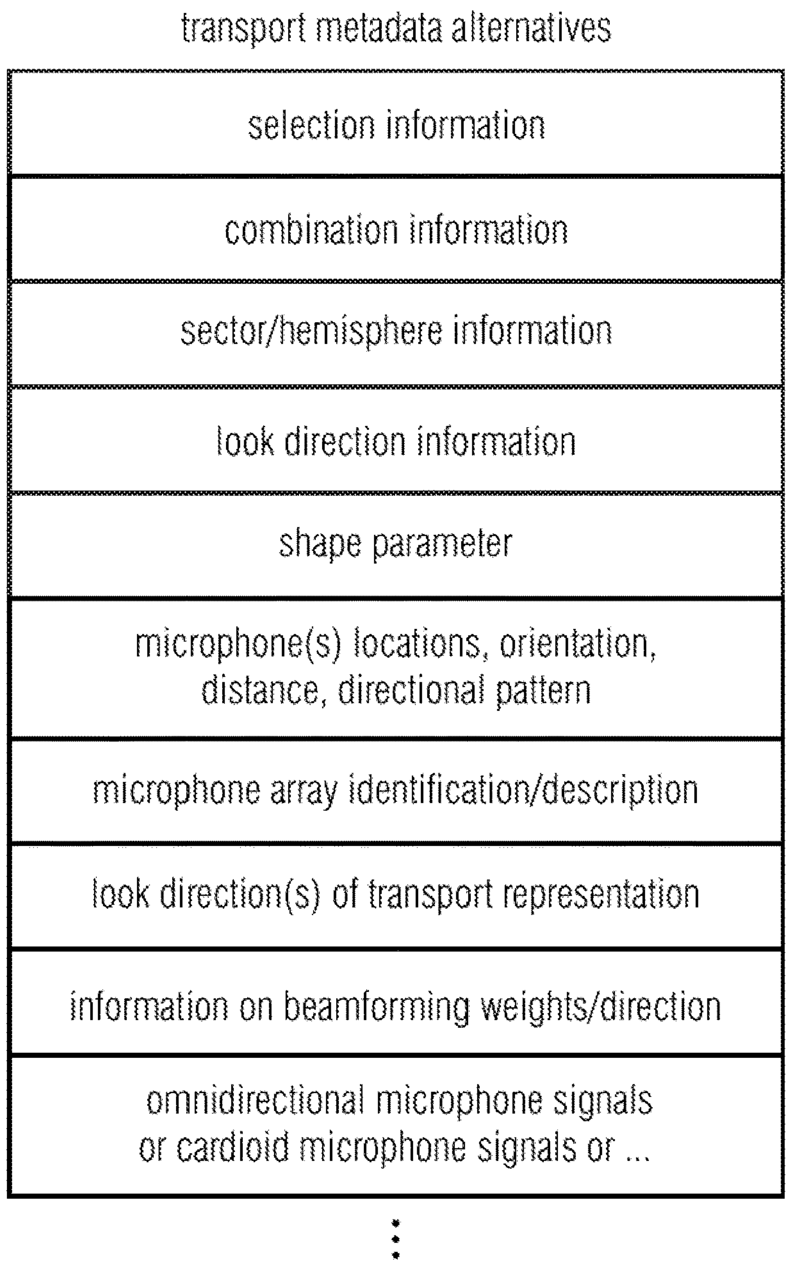
FIG. 8*b* illustrates a table showing different transport metadata alternatives usable individually of each other or together with each other.

FIG. 8*b* illustrates a table of different transport metadata alternatives that can be generated by the transport representation generator 600 of FIG. 6 and that can be used by the spatial audio synthesizer of FIG. 7. The transport metadata alternatives comprise a selection information for the metadata indicating which subset of a set of audio input data components have been selected as the transport representation. An example is, for example, that only two or three out of, for example, four FOA components have been selected. Alternatively, the selection information may indicate which microphone signals of a microphone signal array have been selected. A further alternative of FIG. 8*b* is a combination information indicating how a certain audio representation input component or signals have been combined. A certain combination information may refer to weights for a linear combination or to which channels have been combined, for example with equal or predefined weights. A further information refers to a sector or hemisphere information associated with a certain transport signal. A sector of hemisphere information may refer to the left sector or the right sector or the front sector or the rear sector with respect to a listening position or, alternatively, a smaller sector than a 180° sector.

Further embodiments relate to the transport metadata indicating a shape parameter referring to the shape of, for example, a certain physical or virtual microphone directivity generating the corresponding transport representation signal. The shape parameter may indicate an omnidirectional microphone signal shape or a cardioid microphone signal shape or a dipole microphone signal shape or any other related shape. Further transport metadata alternatives relate to microphone locations, microphone orientations, a distance between microphones or a directional pattern of microphones that have, for example, generated or recorded the transport representation signals included in the (encoded) transport representation 614. Further embodiments relate to the look direction or a plurality of look directions of signals included in the transport representation or information on beamforming weights or beamformer directions or, alternatively or additionally, related to whether the included microphone signals are omnidirectional microphone signals or cardioid microphone signals or other signals. A very small transport metadata side information (with respect to bit rate) can be generated by simply including a single flag indicating whether the transport signals are microphone signals from an omnidirectional microphone or from any other microphone different from an omnidirectional microphone.

Figure 8C:
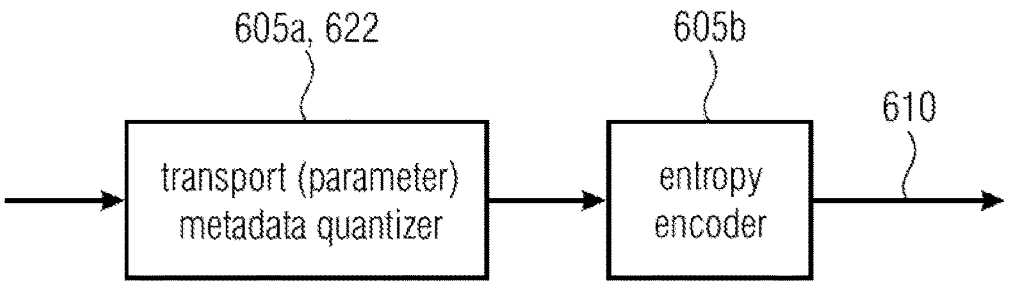
FIG. 8*c* illustrates a further implementation of a metadata encoder for the transport metadata or, if appropriate, for the spatial parameters.

FIG. 8*c* illustrates an implementation of the transport metadata generator 605. In particular, for numerical transport metadata, the transport metadata generator comprises a transport metadata quantizer 605*a* or 622 and a subsequently connected transport metadata entropy encoder 605*b*. The procedures illustrated in FIG. 8*c* can also be applied to parametric metadata and, in particular, to spatial parameters as well.

Figure 9A:
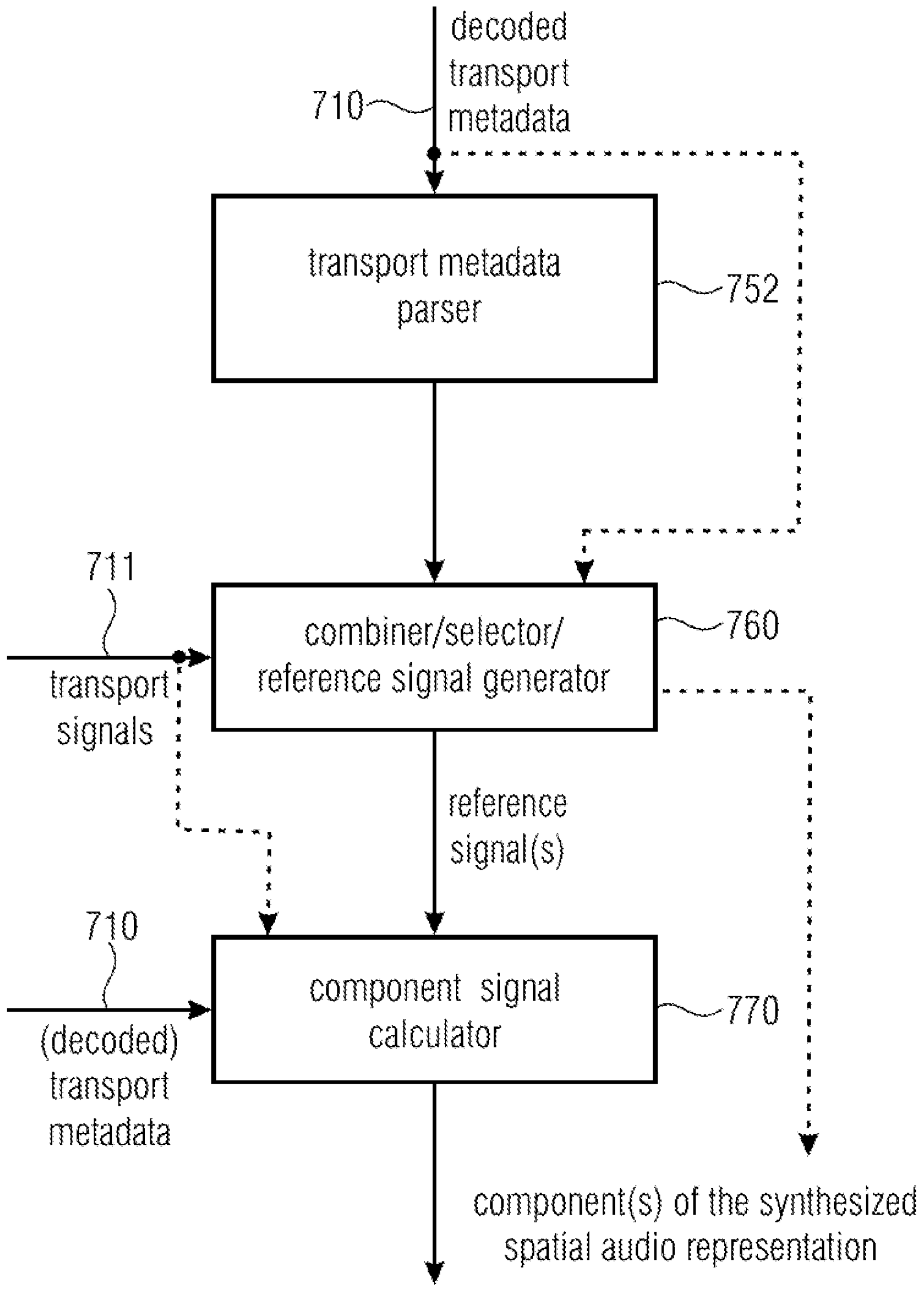
FIG. 9*a* illustrates an implementation of the spatial audio synthesizer of FIG. 7.

FIG. 9*a* illustrates an implementation of the spatial audio synthesizer 750 in FIG. 7. The spatial audio synthesizer 750 comprises a transport metadata parser for interpreting the (decoded) transport metadata 710. The output data from block 752 is introduced into a combiner/selector/reference signal generator 760 that, additionally, receives the transport signal 711 as included in the transport representation obtained from the input interface 700 of FIG. 7. Based on the transport metadata, the combiner/selector/reference signal generator generates one or more reference signals and forwards these reference signals to a component signal calculator 770 that calculates components of the synthesized spatial audio representation such as general components for a multichannel output, Ambisonics components for an FOA or HOA output, left and right channels for a binaural representation or audio object components where an audio object component is a mono or stereo object signal.

Figures 9B, 9C:
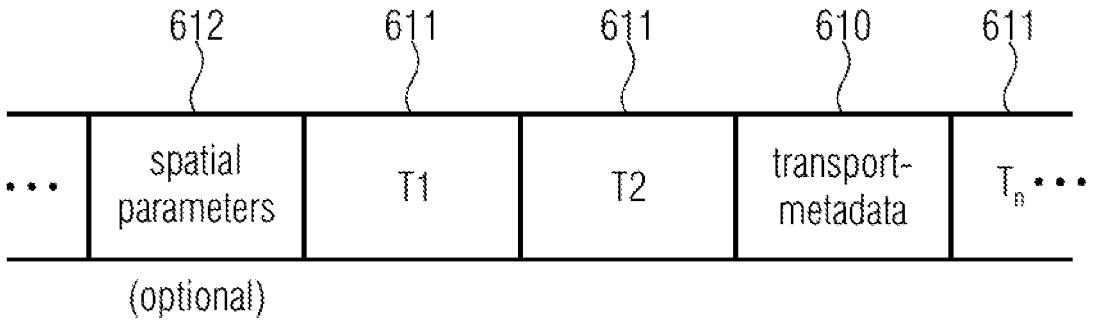
FIG. 9*b* illustrates an encoded audio signal having a transport representation with n transport signals, transport metadata and optional spatial parameters.
FIG. 9*c* illustrates a table illustrating a functionality of the reference signal selector/generator depending on a speaker identification and the transport metadata.

FIG. 9*b* illustrates and encoded audio signal consisting of, for example, n transport signals T1, T2, $T_n$ indicated at item 611 and, additionally, consisting of transport metadata 610 and optional spatial parameters 612. The order of the different data blocks and the size of a certain data block with respect to the other data block is only schematically illustrated in FIG. 9*b*.

FIG. 9*c* illustrates an overview table for the procedure of the combiner/selector/reference signal generator 760 for certain transport meta data, a certain transport representation and a certain speaker setup. In particular, in the FIG. 9*c* embodiment, the transport representation comprises a left transport signal (or a front transport signal or an omnidirectional or cardioid signal) and the transport representation additionally comprises a second transport signal T2 being a right transport signal (or a back transport signal, an omnidirectional transport signal or a cardioid transport signal) for example. In case of left/right, the reference signal for the left speaker A is selected to be the first transport signal T1 and the reference signal for the right speaker is selected as the transport signal T2. For left surround and right surround, the left and the right signals are selected as outlined in the table 771 for the corresponding channels. For the center channel, a sum of the left and right transport signal T1 and T2 is selected as the reference signal for the center channel component of the synthesized spatial audio representation.

In FIG. 9*c*, a further selection is illustrated when the first transport signal T1 is a front transport signal and the second transport signal T2 is a right transport signal. Then, the first transport signal T1 is selected for left, right, center and the second transport signal T2 is selected for left surround and right surround.

Figure 9D:
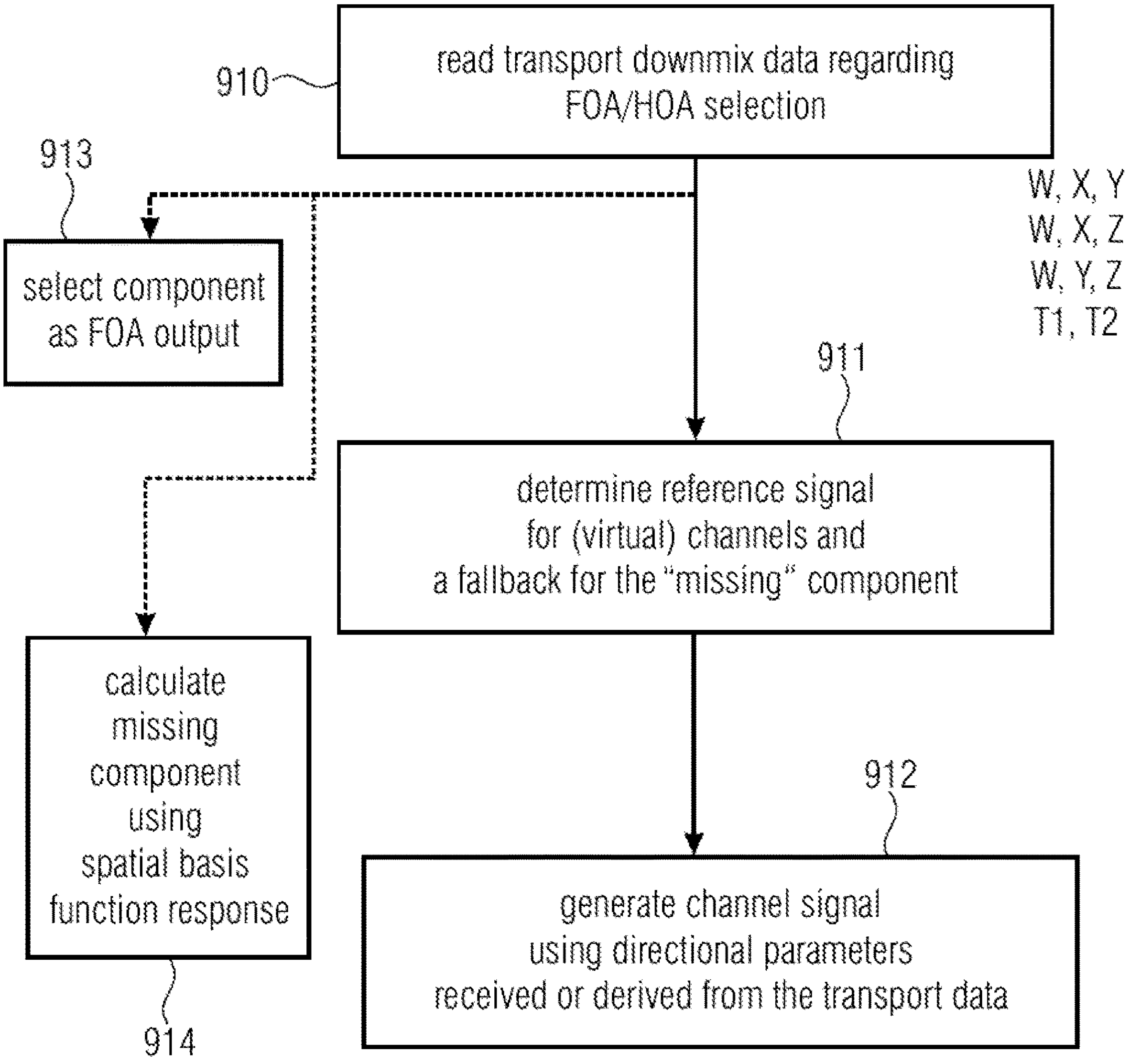
FIG. 9*d* illustrates a further embodiment of the spatial audio synthesizer.

FIG. 9*d* illustrates a further implementation of the spatial audio synthesizer of FIG. 7. In a block 910, the transport or downmix data is calculated regarding a certain first order Ambisonics or higher order Ambisonics selection. Four different selection alternatives are, for example, illustrated in FIG. 9*d* where, in the fourth alternative, only two transport signals T1, T2 are selected rather than a third component that is, in the other alternatives, the omnidirectional component.

The reference signal for the (virtual) channels is determined based on the transport downmix data and a fallback procedure is used for the missing component, i.e., for the fourth component with respect to the examples in FIG. 9*d* or for the two missing components in the case of the fourth example. Then, at block 912, the channel signals are generated using directional parameters received or derived from the transport data. Thus, the directional or spatial parameters can either be additionally received as is illustrated at 712 in FIG. 7 or can be derived from the transport representation by a signal analysis of the transport representation signals.

Figure 10:
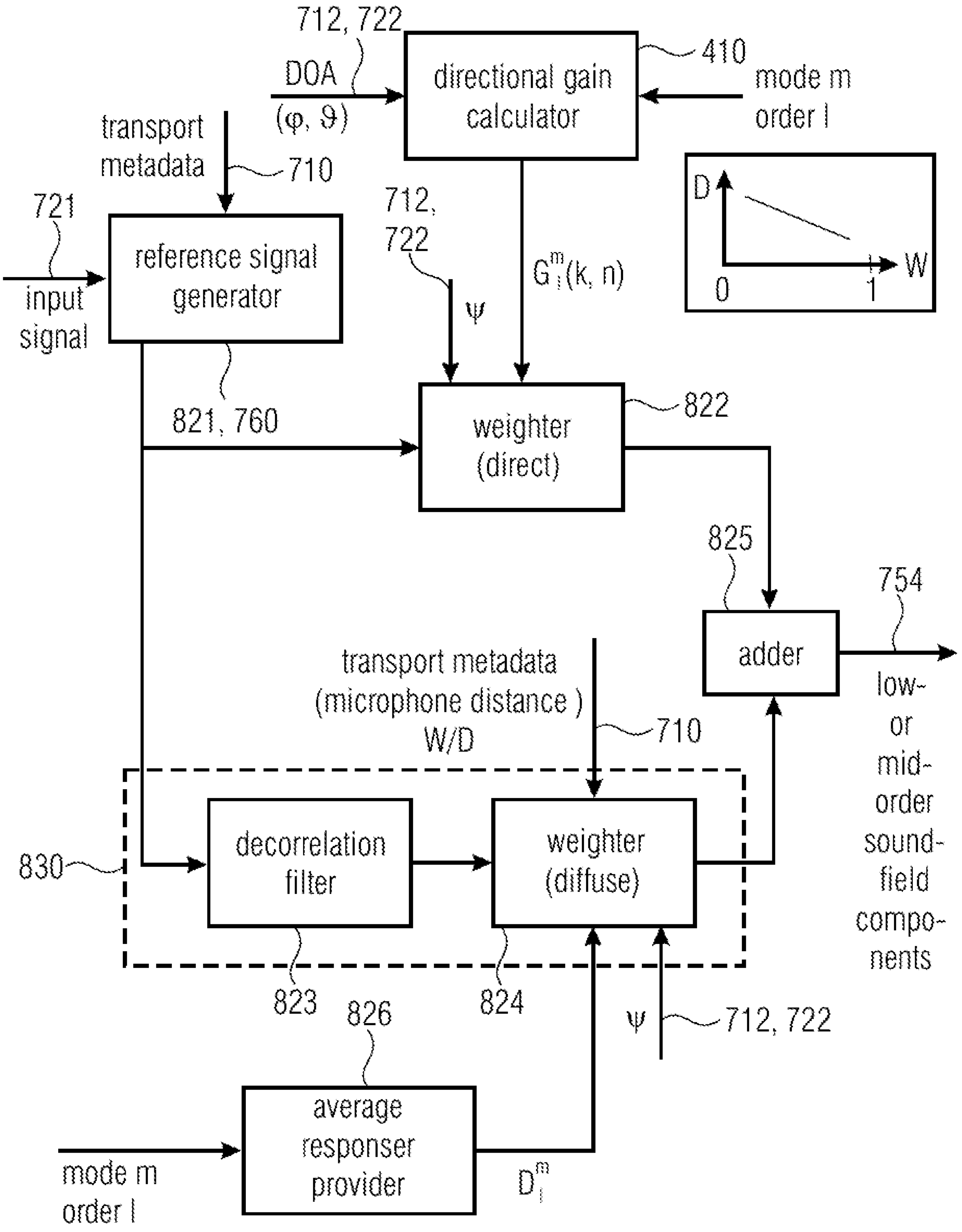
FIG. 10 illustrates an exemplary implementation for calculating low or mid-order sound field components using a direct signal and a diffuse signal.

In an alternative implementation, a selection of a component as an FOA component is performed as indicated in block 913 and the calculation of the missing component is performed using a spatial basis function response as illustrated at item 914 in FIG. 9*d*. A certain procedure using a spatial basis functional response is illustrated in FIG. 10 at block 410 where, in FIG. 10, block 826 provides an average response for the diffuse portion while block 410 in FIG. 10 provides a specific response for each mode m and order l for the direct signal portion.

Figures 9E, 9F:
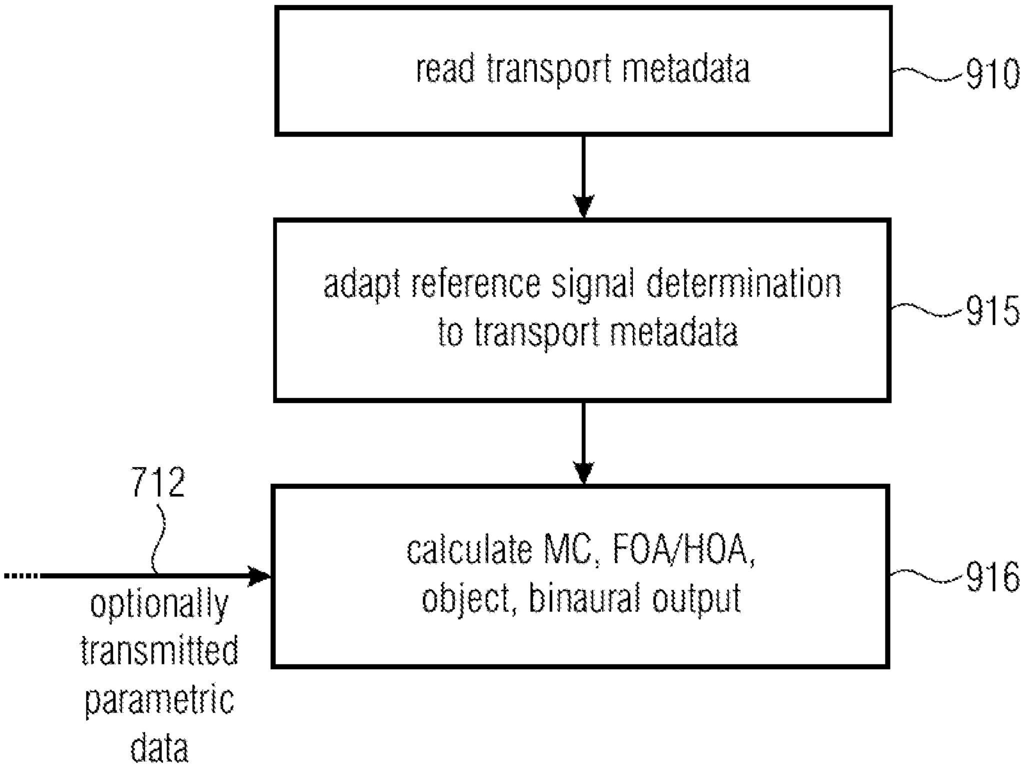
FIG. 9*e* illustrates a further table showing different transport metadata.
FIG. 9*f* illustrates a further implementation of the spatial audio synthesizer.

FIG. 9*e* illustrates a further table indicating certain transport metadata particularly comprising a shape parameter or a look direction in addition to the shape parameter or alternative to the shape parameter. The shape parameter may comprise the shape factor $c_m$ being 1, 0.5 or 0. The factor $c_M$=1 indicates an omnidirectional shape of the microphone recording characteristic, while a factor of 0.5 indicates a cardioid shape and a value of 0 indicates a dipole shape.

Furthermore, different look directions can comprise left, right, front, back, up, down, a specific direction of arrival consisting of an azimuth angle φ and an elevation angle θ or, alternatively, a short metadata consisting of an indication that the pair of signals in the transport representation comprise a left/right pair or a front/back pair.

In FIG. 9*f*, a further implementation of the spatial audio synthesizer is illustrated where, in block 910, the transport metadata are read as is, for example, done by the input interface 700 of FIG. 7 or an input port of the spatial audio synthesizer 750. In block 950, a reference signal determination is adapted to the read transport metadata as is performed, for example, by block 760. Then, in block 916, the multichannel, FOA/HOA, object or binaural output and, in particular, the specific components for these kinds of data output are calculated using the reference signal obtained via block 915 and the optionally transmitted parametric data 712 if available.

Figure 9G:
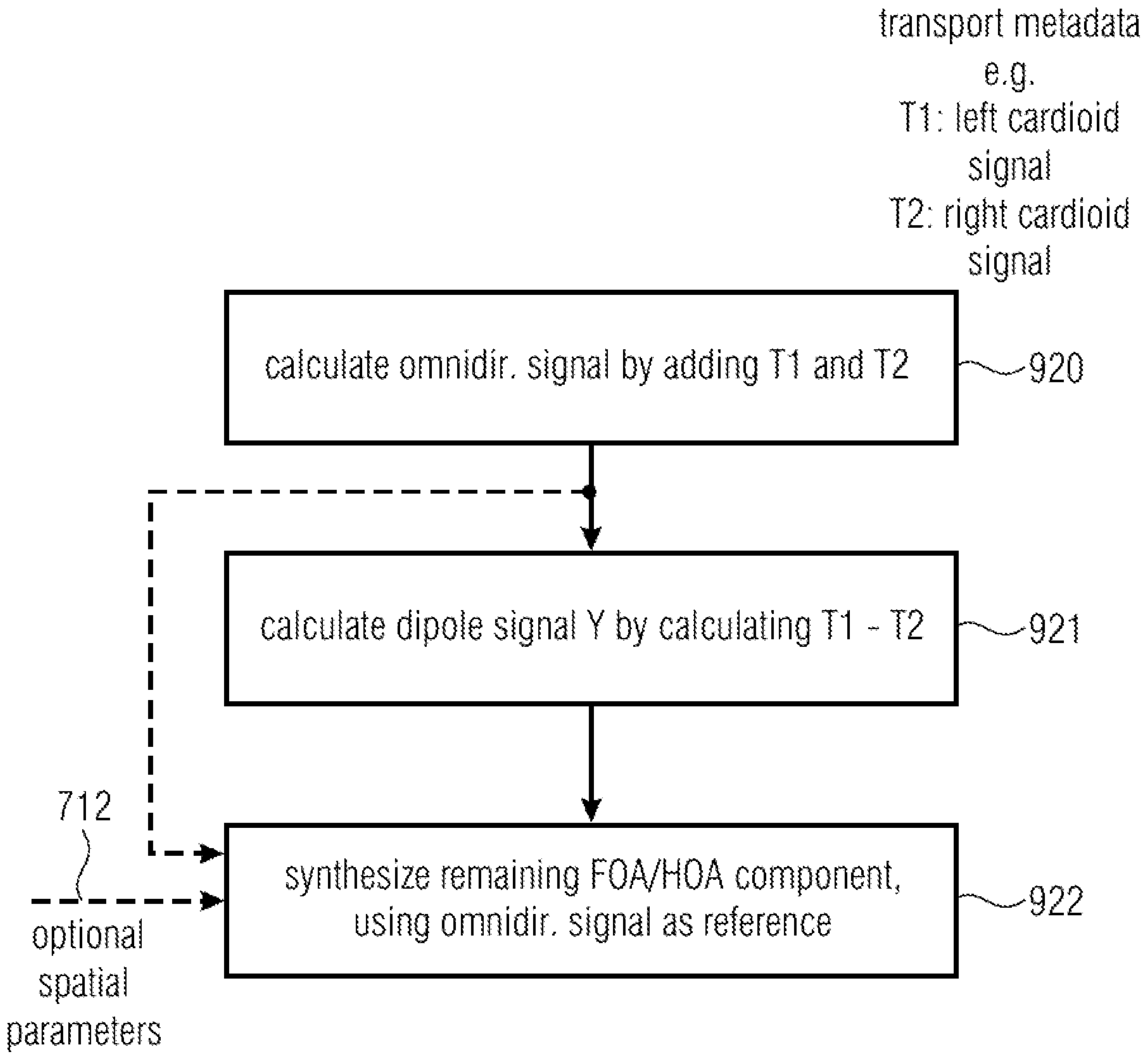
FIG. 9*g* illustrates a further embodiment of the spatial audio synthesizer.

FIG. 9*g* illustrates a further implementation of the combiner/selector/reference signal generator 760. When the transport metadata illustrates, for example, that the first transport signal T1 is a left cardioid signal and the second transport signal T2 is a right cardioid signal, then, in block 920, an omnidirectional signal is calculated by adding T1 and T2. As outlined by block 921, a dipole signal Y is calculated by obtaining the difference between T1 and T2 or the difference between T2 and T1. Then, in block 922, the remaining components are synthesized using an omnidirectional signal as a reference. The omnidirectional signal used as the reference in block 922 is advantageously the output of block 920. Additionally, as outlined at item 712, optional spatial parameters can be used as well for synthesizing the remaining components such as FOA or HOA components.

Figure 9H:
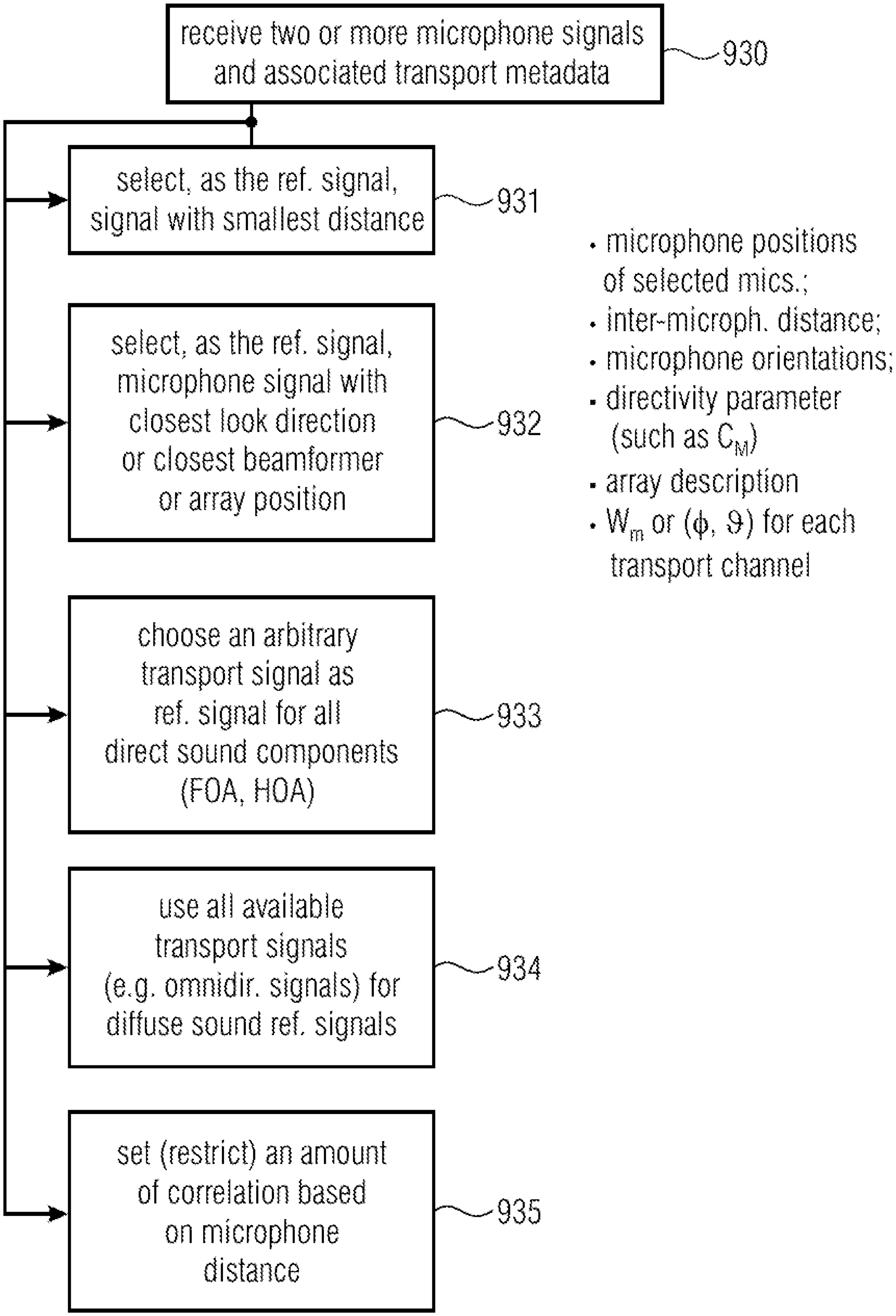
FIG. 9*h* illustrates a further set of implementation alternatives for the spatial audio synthesizer usable individually of each other or together with each other.

FIG. 9*h* illustrates a further implementation of different alternatives for the procedure that can be done by the spatial audio synthesizer or the combiner/selector/reference signal generator 760 when, as outlined in block 930, two or more microphone signals are received as the transport representation and associated transport metadata are received as well. As outlined in block 931, a selection can be performed as the reference signal for a certain signal component, of the transport signal with the smallest distance to a certain, for example, loudspeaker position. A further alternative illustrated in block 932 comprises the selection of a microphone signal with the closest look direction as the reference signal for a certain speaker or with a closest beamformer or error position with respect to a certain loudspeaker or virtual sound source such as left/right in a binaural representation, for example. A further alternative illustrated in block 933 is the choosing of an arbitrary transport signal as a reference signal for all direct sound components such as for the calculation of FOA or HOA components or for the calculation of loudspeaker signals. A further alternative illustrated at 934 refers to the usage of all available transport signals such as omnidirectional signals for calculating diffuse sound reference signals. Further alternatives relate to the setting or restricting of an amount of correlation for the calculation of a component signal based on a microphone distance included in the transport metadata.

For the purpose of performing one or several of the alternatives 931 to 935, several associated transport metadata are useful that are indicated to the right of FIG. 9*h* as comprising microphone positions of selective microphones, an inter microphone distance, microphone orientations or directivity patterns such as $c_M$, an array description, beamforming factors $w_m$ or the actual direction of arrival or sound direction with an azimuth angle φ and an elevation angle θ, for example, for each transport channel.

FIG. 10 illustrates an implementation of a low or mid-order components generator for the direct/diffuse procedure. In particular, the low or mid-order components generator comprises a reference signal generator 821 that receives the input signal and generates the reference signal by copying or taking as it is when the input signal is a mono signal or by deriving the reference signal from the input signal by calculation as discussed before or as illustrated in WO 2017/157803 A1 incorporated herein by reference with its entire teaching and advantageously controlled by the transport metadata.

Furthermore, FIG. 10 illustrates the directional gain calculator 410 that is configured to calculate, from the certain DOA information (Φ, θ) and from a certain mode number m and a certain order number l the directional gain $G_l^m$. In the embodiment, where the processing is done in the time/frequency domain for each individual tile referenced by k, n, the directional gain is calculated for each such time/frequency tile. The weighter 820 receives the reference signal and the diffuseness data for the certain time/frequency tile and the result of the weighter 820 is the direct portion. The diffuse portion is generated by the processing performed by the decorrelation filter 823 and the subsequent weighter 824 receiving the diffuseness value W for the certain time frame and the frequency bin and, in particular, receiving the average response to a certain mode m and order l indicated by $D_l$ generated by an average response provider 826 that receives, as an input, the required mode m and the required order l.

The result of the weighter 824 is the diffuse portion and the diffuse portion is added to the direct portion by the adder 825 in order to obtain a certain mid-order sound field component for a certain mode m and a certain order l. It is advantageous to apply the diffuse compensation gain discussed with respect to FIG. 6 only to the diffuse portion generated by block 823. This can advantageously be done within the procedure done by the (diffuse) weighter. Thus, only the diffuse portion in the signal is enhanced in order to compensate for the loss of diffuse energy incurred by higher components that do not receive a full synthesis as illustrated in FIG. 10.

Figure 11:
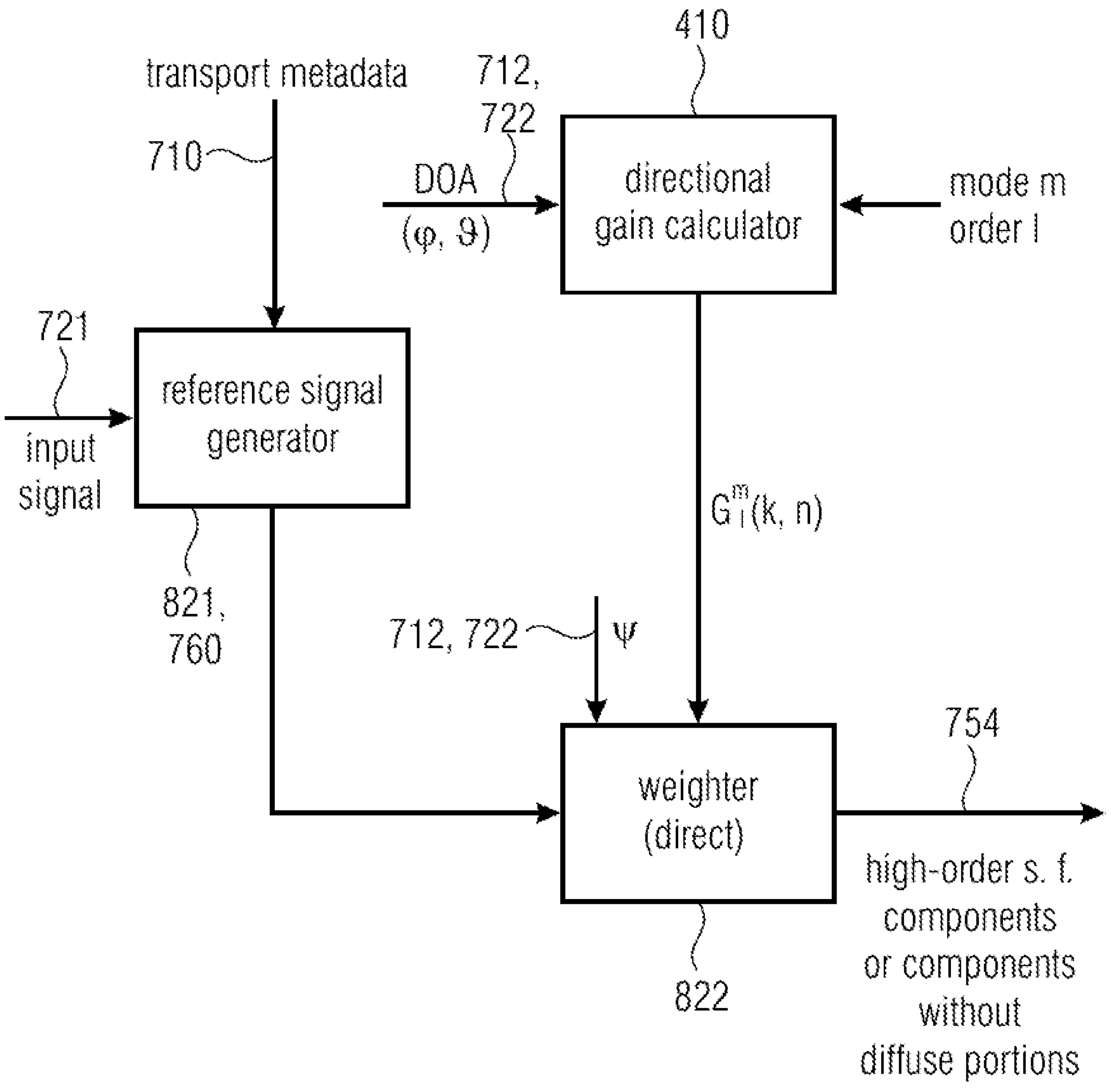
FIG. 11 illustrates a further implementation of a calculation of higher-order sound field components only using a direct component without a diffuse component.

A direct portion only generation is illustrated in FIG. 11 for the high-order components generator. Basically, a high-order components generator is implemented in the same way as the low or mid-order components generator with respect to the direct branch but does not comprise blocks 823, 824, 825 and 826. Thus, the high-order components generator only comprises the (direct) weighter 822 receiving input data from the directional gain calculator 410 and receiving a reference signal from the reference signal generator 821. Advantageously, only a single reference signal for the high-order components generator and low or the mid-order components generator is generated. However, both blocks can also have individual reference signal generators as the case may be. Nevertheless, it is advantageous to only have a single reference signal generator. Thus, the processing performed by the high-order components generator is extremely efficient, since only a single weighting direction with a certain directional gain $G_l^m$ with a certain diffuseness information W for the time/frequency tile is to be performed. Thus, the high-order sound field components can be generated extremely efficiently and promptly and any error due to a non-generation of diffuse components or non-usage of diffuse components in the output signal is easily compensated for by enhancing the low-order sound field components or the advantageously only diffuse portion of the mid-order sound field components. The procedure illustrated in FIG. 11 can also be used for the low or mid order component generation.

FIG. 10, thus, illustrates the generation of low or mid-order sound field components that have a diffuse portion, while FIG. 11 illustrates the procedure of calculating high order sound field components or, generally, components that do not require or do not receive any diffuse portions.

However, in generating the sound field components, particularly for an FOA or HOA representation, either the procedure of FIG. 10 with the diffuse portion or the procedure of FIG. 11 without the diffuse portion can be applied. The reference signal generator 821, 760 is controlled in both procedures in FIG. 10 and FIG. 11 by the transport metadata. Furthermore, the weighter 822 is controlled not only by the spatial basis function response $G_l^n$ but advantageously also by spatial parameters such as the diffuseness parameters 712, 722. Furthermore, in an embodiment, the weighter 824 for the diffuse portion is also controlled by the transport metadata and, in particular, by the microphone distance. A certain relation between the microphone distance D and the weighting factor W is illustrated in the schematic sketch in FIG. 10. A high distance D results in a small weighting factor and a small distance results in a high weighting factor. Thus, when there are two microphone signals included in the transport signal representation that a have a high distance to each other, one can assume that both microphone signals are already quite decorrelated and, therefore, the output of the decorrelation filter can be weighted with a weighting factor close to zero so that, in the end, the signal input into the adder 825 is very small compared to the signal input into the adder from the direct weighter 822. In an extreme case, the correlation branch can even be switched off which can, for example, be achieved by setting the weight W=0. Naturally, there are other ways of switching off the diffuse branch by using a switch calculated by a threshold operation or so.

Naturally, the component generation illustrated in FIG. 10 can be performed by only controlling the reference signal generator 821, 760 by the transport metadata without the control of the weighter 804 or, alternatively, by only controlling the weighter 804 without any reference signal generation control of block 821, 760.

FIG. 11 illustrates the situation where the diffuse branch is missing and where, therefore, any control of the diffuse weighter 824 of FIG. 10 is not performed as well.

Figure 12:
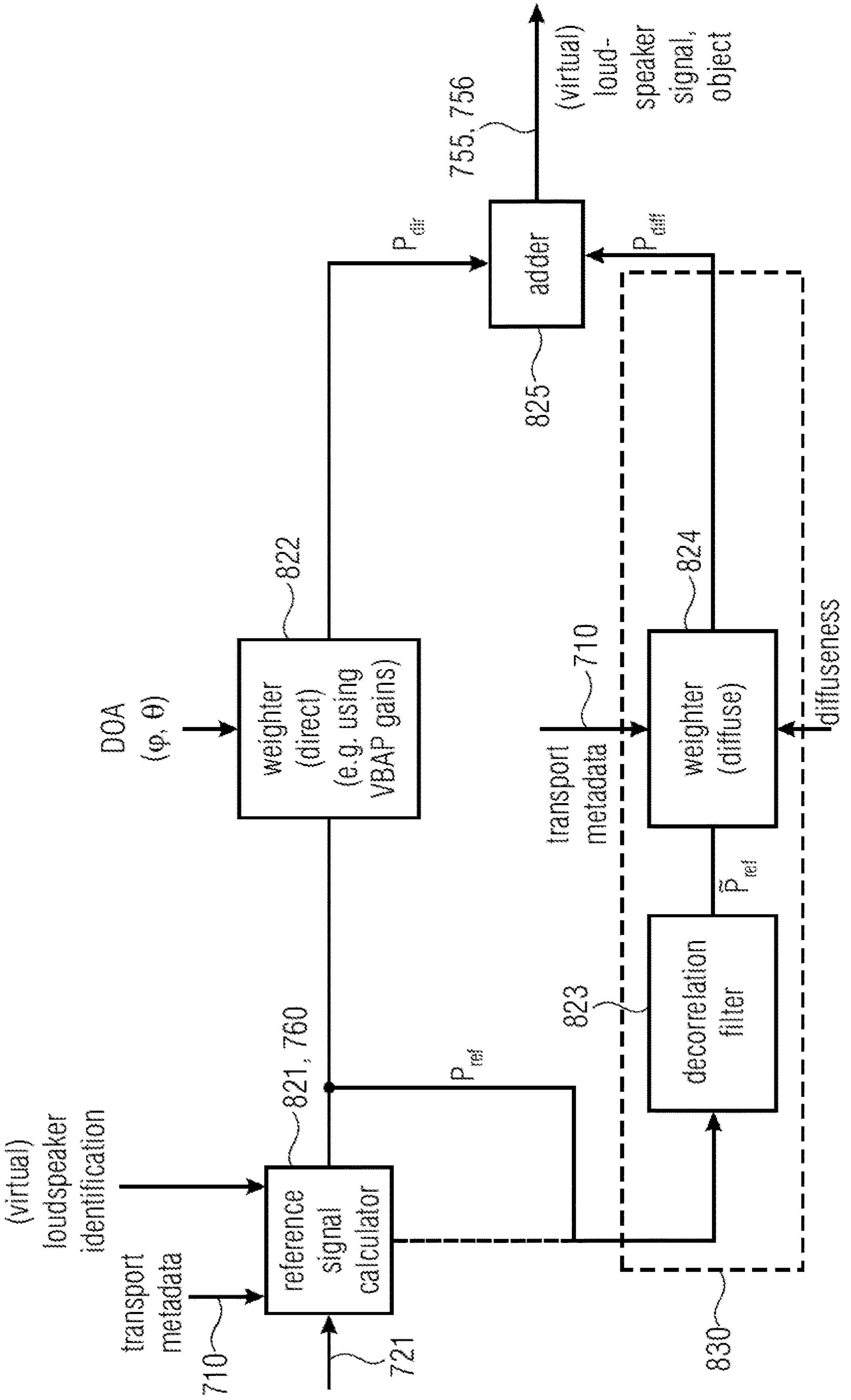
FIG. 12 illustrates a further implementation of the calculation of (virtual) loudspeaker signal components or objects using a direct portion combined with a diffuse portion.

FIGS. 10 and 12 illustrate a certain diffuse signal generator 830 comprising the decorrelation filter 823 and the weighter 824. Naturally, the order in the signal processing between the weighter 824 and the decorrelation filter 823 can be exchanged so that a weighting of the reference signal generated or output by the reference signal generator 821, 760 is performed before the signal is input into the decorrelation filter 823.

While FIG. 10 illustrates a generation of low or mid-order sound field components of a sound field component representation such as FOA or HOA, i.e., a representation with spherical or cylindrical component signals, FIG. 12 illustrates an alternative or general implementation for the calculation of loudspeaker component signals or objects. In particular, for the generation and calculation of loudspeaker signals/objects, a reference signal generator 821, 760 is provided that corresponds to block 760 of FIG. 9*a*. Furthermore, the component signal calculator 770 illustrated in FIG. 9*a* comprises, for the direct branch, the weighter 822, and, for the diffuse branch, the diffuse signal generator 830 comprising the decorrelation filter 823 and the weighter 824. Furthermore, the component signal calculator 770 of FIG. 9*a* additionally comprises the adder 825 that performs an adding of the direct signal $P_{dir}$ and the diffuse signal $P_{diff}$. The output of the adder is a (virtual) loudspeaker signal or object signal or binaural signal as indicated by example reference numbers, 755, 756. In particular, the reference signal calculator 821, 760 is controlled by the transport metadata 710 and the diffuse weighter 824 can also be controlled by the transport metadata 710. Generally, the component signal calculator calculates a direct portion, for example using panning gains such as VBAP (virtual base amplitude panning) gains. The gains are derived from a direction of arrival information, advantageously given with an azimuth angle φ and an elevation angle θ. This results in the direct portion $P_{dir}$.

Furthermore, the reference signal generated by the reference signal calculator $P_{ref}$ is input into the decorrelation filter 823 to obtain a decorrelated reference signal and then the signal is weighted, advantageously using a diffuseness parameter and also advantageously using a microphone distance obtained from the transport metadata 710. The output of the weighter 824 is the diffuse component $P_{diff}$ and the adder 825 adds the direct component and the diffuse component to obtain a certain loudspeaker signal or object signal or binaural channel for the corresponding representation. In particular, when virtual loudspeaker signals are calculated the procedure performed by the reference signal calculator 821, 760 in reply to the transport metadata can be performed as illustrated in FIG. 9*c*. alternatively, reference signals can be generated as channels pointing from a defined listening position to the specific speaker, and this calculation of the reference signal can be performed using a linear combination of the signals included in the transport representation.

EMBODIMENTS OF THE INVENTION AS A LIST

FOA-Based Input

- A spatial audio scene encoder
  - Receiving spatial audio input signals representing a spatial audio scene (e.g. FOA components)
  - Generating or receiving spatial audio parameters comprising at least one direction parameter
  - Generating a down-mix audio signal based on the received audio input signals (Option: use also the spatial audio parameters for adaptive down-mix generation).
  - Generating down-mix parameters describing directional properties of the down-mix signals (e.g. down-mix coefficients or directivity patterns).
  - Encoding the down-mix signals, the spatial audio parameters and the down-mix parameters.
- A spatial audio scene decoder
  - Receiving an encoded spatial audio scene comprising a down-mix audio signal, spatial audio parameters and down-mix parameters
  - Decoding the down-mix audio signals, the spatial audio parameters and the down-mix/transport channel parameters
  - A spatial audio renderer for spatially rendering the decoded representation based on the down-mix audio signals, the spatial audio parameters and the down-mix (positional) parameters.

Input Based on Spaced Microphone Recordings and Associated Spatial Metadata (Parametric Spatial Audio Input):

- A spatial audio scene encoder
  - Generating or receiving at least two spatial audio input signals generated from recorded microphone signals
  - Generating or receiving spatial audio parameters comprising at least one direction parameter
  - Generating or receiving position parameters describing geometric or positional properties of the spatial audio input signals generated from recorded microphone signals (e.g. relative or absolute position of the microphones or inter-microphone spacings).
  - Encoding the spatial audio input signals or down-mix signals derived from the spatial audio input signals, the spatial audio parameters and the position parameters.
- A spatial audio scene decoder
  - Receiving an encoded spatial audio scene comprising at least two audio signals, spatial audio parameters and positional parameters (related to positional properties of the audio signals).
  - Decoding the audio signals, the spatial audio parameters and the positional parameters
  - A spatial audio renderer for spatially rendering the decoded representation based on the audio signals, the spatial audio parameters and the positional parameters.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[Pulkki07] V. Pulkki, "Spatial Sound Reproduction with Directional Audio Coding", J. Audio Eng. Soc., Volume 55 Issue 6 pp. 503-516; June 2007.

[Pulkki97] V. Pulkki, "Virtual Sound Source Positioning Using Vector Base Amplitude Panning" J. Audio Eng. Soc., Volume 45 Issue 6 pp. 456-466; June 1997

[Thiergart09] O. Thiergart, R. Schultz-Amling, G. Del Galdo, D. Mahne, F. Kuech, "Localization of Sound Sources in Reverberant Environments Based on Directional Audio Coding Parameters", AES Convention 127, Paper No. 7853, October 2009

[Thiergart17] WO2017157803 A1, O. Thiergart et. al. "APPARATUS, METHOD OR COMPUTER PROGRAM FOR GENERATING A SOUND FIELD DESCRIPTION"

[Laitinen11] M. Laitinen, F. Kuech, V. Pulkki, "Using Spaced Microphones with Directional Audio Coding", AES Convention 130, Paper No. 8433, May 2011

[Vilkamo13] J. Vilkamo, V. Pulkki, "Minimization of Decorrelator Artifacts in Directional Audio Coding by Covariance Domain Rendering", J. Audio Eng. Soc., Vol. 61, No. 9, 2013 September

[Veen88] B. D. Van Veen, K. M. Buckley, "Beamforming: a versatile approach to spatial filtering", IEEE ASSP Mag., vol. 5, no. 2, pp. 4-24, 1998

[1] V. Pulkki, M-V Laitinen, J Vilkamo, J Ahonen, T Lokki and T Pihlajamäki, "Directional audio coding—perception-based reproduction of spatial sound", International Workshop on the Principles and Application on Spatial Hearing, November 2009, Zao; Miyagi, Japan.

[2] M. V. Laitinen and V. Pulkki, "Converting 5.1 audio recordings to B-format for directional audio coding reproduction," 2011 IEEE International Conference on Acoustics, Speech and Signal Processing (ICASSP), Prague, 2011, pp. 61-64

[3] R. K. Furness, "Ambisonics—An overview," in AES 8th International Conference, April 1990, pp. 181-189.

[4] C. Nachbar, F. Zotter, E. Deleflie, and A. Sontacchi, "AMBIX—A Suggested Ambisonics Format", Proceedings of the Ambisonics Symposium 2011

The invention claimed is:

1. An apparatus for encoding a spatial audio representation representing an audio scene to acquire an encoded audio signal, the apparatus comprising:

a transport representation generator
  configured for generating a transport representation from the spatial audio representation, and
  configured for generating transport metadata related to the generation of the transport representation;

a parameter processor for deriving spatial parameters from the spatial audio representation; and an output interface configured for multiplexing encoded information on the transport representation, encoded information on the spatial parameters, and encoded information on the transport metadata to obtain the encoded audio signal, wherein the spatial audio representation is a first order Ambisonics or a higher order Ambisonics representation comprising a multitude of coefficient signals, or a multi-channel representation comprising a plurality of audio channels, wherein the transport representation generator is configured to combine two more coefficient signals from the higher order Ambisonics representation or the first order Ambisonics representation, or to combine two or more audio channels from the multichannel representation, and wherein the transport representation generator (600) is configured to generate, as the transport metadata, information on how the two or more coefficient signals from the higher order Ambisonics representation or the first order Ambisonics representation or the two or more audio channels from the multichannel representation have been combined, or which ones of the two or more coefficient signals from the first order Ambisonics representation or the higher order Ambisonics representation or which ones of the two or more audio channels from the multichannel representation have been combined.

2. The apparatus of claim 1, wherein the parameter processor is configured for deriving, as the spatial parameters, at least one time or frequency-dependent direction of arrival (DoA) data and frequency or time-dependent diffuseness data.

3. The apparatus of claim 1, wherein the transport representation generator is configured to determine whether a dominant sound energy originates from a specific sector or hemisphere such as a left or right hemisphere or a forward or backward hemisphere, or wherein the transport representation generator is configured to generate a first transport signal from the specific sector or hemisphere, where the dominant sound energy originates, and a second transport signal from a different sector or hemisphere such as the sector or hemisphere comprising an opposite direction with respect to a reference location and with respect to the specific sector or hemisphere, and wherein the transport representation generator is configured to determine the transport metadata so that the transport metadata comprises information identifying the specific sector or hemisphere, or identifying the different sector or hemisphere.

4. The apparatus of claim 1, wherein the transport representation generator is configured to combine the coefficient signals of the spatial audio representation so that a first resulting signal being a first transport signal corresponds to a directional microphone signal directed to a specific sector or hemisphere, and a second resulting signal being a second transport signal corresponds to a directional microphone signal directed to a different sector or hemisphere.

5. The apparatus of claim 1, wherein the transport representation generator is configured to generate the transport representation and the transport metadata in a time-variant or frequency-dependent way, so that the transport representation and the transport metadata for a first frame is different from the transport representation and the transport metadata for a second frame, or so that the transport representation and the transport metadata for a first frequency band is different from a transport representation and the transport metadata for a second different frequency band.

6. The apparatus of claim 1, wherein the transport representation generator is configured to generate one or two transport signals by a weighted combination of two or more than two coefficient signals of the spatial audio representation, and wherein the transport representation generator is configured to calculate the transport metadata so that the transport metadata comprises information on weights used in the weighted combination, or information on an azimuth and/or elevation angle as a look direction of a generated directional microphone signal, or information on a shape parameter indicating a directional characteristic of a directional microphone signal.

7. The apparatus of claim 1, wherein the transport representation generator is configured to generate quantitative transport metadata, to quantize the quantitative transport metadata to acquire quantized transport metadata, and to entropy encode the quantized transport metadata, and wherein the output interface is configured to comprise the encoded transport metadata into the encoded audio signal.

8. The apparatus of claim 1, wherein the transport representation generator is configured to transform the transport metadata into a table index or a preset parameter, and wherein the output interface is configured to comprise the table index or the preset parameter into the encoded audio signal.

9. The apparatus of claim 1, wherein the spatial audio representation comprises at least two audio signals and spatial parameters, wherein a parameter processor is configured to derive the spatial parameters from the spatial audio representation by extracting the spatial parameters from the spatial audio representation, wherein the output interface is configured to comprise information on the spatial parameters into the encoded audio signal or to comprise information on processed spatial parameters derived from the spatial parameters into the encoded audio signal, or wherein the transport representation generator is configured to combine the at least two audio signals or a subset of the at least two audio signals and to calculate the transport metadata such that the transport metadata comprises information on the combination of the audio signals performed for calculating the transport representation of the spatial audio representation.

10. The apparatus of claim 1, wherein the transport representation generator is configured to combine audio signals comprised in the spatial audio representation using spatial filtering or beamforming, and wherein the transport representation generator is configured to comprise information on a look direction of the transport representation or information on beamforming weights used in calculating the transport representation into the transport metadata.

11. The apparatus of claim 1, wherein the spatial audio representation is a description of a sound field related to a reference position, and wherein a parameter processor is configured to derive spatial parameters from the spatial audio representation, wherein the spatial parameters define time-variant or frequency-dependent parameters on a direction of arrival of sound at the reference position or time-variant or frequency-dependent parameters on a diffuseness of the sound field at the reference position, or wherein the transport representation generator comprises a downmixer for generating, as the transport representation, a downmix representation comprising a second number of individual signals being smaller than a first number of individual signals comprised in the spatial audio representation, wherein the downmixer is configured to combine the individual signals comprised in the spatial audio representation in order to decrease the first number of signals to the second number of signals.

12. The apparatus of claim 1, wherein a parameter processor comprises a spatial audio analyzer for deriving the spatial parameters from the spatial audio representation by performing an audio signal analysis, and wherein the transport representation generator is configured to generate the transport representation based on the result of the spatial audio analyzer, or wherein the transport representation comprises a core encoder for core encoding one or more audio signals of the transport signals of the transport representation, or wherein the parameter processor is configured to quantize and entropy encode the spatial parameters, and wherein the output interface is configured to comprise a core-encoded transport representation as the information on the transport representation into the encoded audio signal or to comprise the entropy encoded spatial parameters as the information on spatial parameters into the encoded audio signal.

13. The apparatus for decoding an encoded audio signal, comprising:

an input interface for receiving the encoded audio signal comprising, in a multiplexed form, encoded information on a transport representation comprising a plurality of transport signals, encoded information on spatial parameters, and encoded information on transport metadata; and a spatial audio synthesizer for synthesizing a spatial audio representation using the information on the transport representation, the information on the spatial parameters, and the information on the transport metadata, wherein the transport metadata indicates a first transport signal of the plurality of transport signals as referring to a first sector or hemisphere related to a reference position of the spatial audio representation and a second transport signal of the plurality of transport signals as referring to a second different sector or hemisphere related to the reference position of the spatial audio representation, wherein the spatial audio synthesizer is configured to generate a component signal of the spatial audio representation associated with the first sector or hemisphere using the first transport signal and without using the second transport signal, or to generate another component signal of the spatial audio representation associated with the second sector or hemisphere using the second transport signal and not using the first transport signal, or wherein the transport metadata indicate information on look directions of the plurality of transport signals of the transport representation, and wherein the spatial audio synthesizer is configured to calculate different first order Ambisonics components of the spatial audio representation using the information on the look directions, and using the transport signals.

14. The apparatus of claim 13, wherein the input interface is configured for receiving, as the information on the spatial parameters, at least one encoded time or frequency-dependent direction of arrival (DoA) data and frequency or time-dependent diffuseness data, and wherein the spatial audio synthesizer is configured for synthesizing the spatial audio representation additionally using the at least one time or frequency-dependent direction of arrival (DoA) data and frequency or time-dependent diffuseness data.

15. The apparatus of claim 13, wherein the spatial audio synthesizer comprises:

a core decoder for core decoding two or more encoded transport signals representing the information on the transport representation to acquire two or more decoded transport signals, or wherein the spatial audio synthesizer is configured to calculate a first order Ambisonics or a higher order Ambisonics representation or a multi-channel signal or an object representation or a binaural representation of the spatial audio representation, or wherein the spatial audio synthesizer comprises a metadata decoder for decoding the information on the transport metadata to derive the decoded transport metadata or for decoding information on spatial parameters to acquire decoded spatial parameters.

16. The apparatus of claim 13, wherein the spatial audio representation comprises a plurality of component signals, wherein the spatial audio synthesizer is configured to determine, for a component signal of the spatial audio representation, a reference signal using the information on the transport representation and the information on the transport metadata, and to calculate the component signal of the spatial audio representation using the reference signal and information on spatial parameters, or to calculate the component signal of the spatial audio representation using the reference signal.

17. The apparatus of claim 13, wherein the transport metadata comprises information on a directional characteristic associated with the transport signals of the transport representation, wherein the spatial audio synthesizer is configured to calculate virtual microphone signals using the first order Ambisonics or the higher order Ambisonics signals, loudspeaker positions and the transport metadata, or wherein the spatial audio synthesizer is configured to determine the directional characteristics of the transport signals using the transport metadata and to determine the first order Ambisonics or a higher order Ambisonics component from the transport signals in line with the determined directional characteristics of the transport signals, and to determine another first order Ambisonics or higher order Ambisonics component not associated with the directional characteristics of the transport signals in accordance with a fallback process.

18. The apparatus of claim 13, wherein the transport metadata comprises an information on a first look direction associated with the first transport signal, and an information on a second look direction associated with the second transport signal, wherein the spatial audio synthesizer is configured to select a reference signal for the calculation of the component signal or the other component signal of the spatial audio representation based on the transport metadata and the position of a loudspeaker associated with the component signal or the other component signal of the spatial audio representation.

19. The apparatus of claim 18, wherein the first look direction indicates a left or a front hemisphere, wherein the second look direction indicates a right or a back hemisphere, wherein, for the calculation of the component signal or the other component signal for a loudspeaker in the left hemisphere, the first transport signal and not the second transport signal is used, or wherein for the calculation of a loudspeaker signal in the right hemisphere, the second transport signal and not the first transport signal is used, or wherein for the calculation of the component signal or the other component signal for a loudspeaker in a front hemisphere, the first transport signal and not the second transport signal is used, or wherein for the calculation of a loudspeaker in a back hemisphere, the second transport signal and not the first transport signal is used, or wherein for the calculation of the component signal or the other component signal for a loudspeaker in a center region, a combination of the left transport signal and the second transport signal is used, or wherein for the calculation of the component signal or the other component signal for a loudspeaker signal associated with a loudspeaker in a region between the front hemisphere and the back hemisphere, a combination of the first transport signal and the second transport signal is used.

20. The apparatus of claim 13, wherein the information on the transport metadata indicates, as a first look direction, a left direction for the first left transport signal and indicates, as a second look direction, a right look direction for the second transport signal, wherein the spatial audio synthesizer is configured to calculate a first Ambisonics component by adding the first transport signal and the second transport signal, or to calculate a second Ambisonics component by subtracting the first transport signal and the second transport signal, or wherein another Ambisonics component is calculated using a sum of the first transport signal and the second transport signal.

21. The apparatus of claim 13, wherein the transport metadata indicates, for the first transport signal, a front look direction and indicates, for the second transport signal, a back look direction, wherein the spatial audio synthesizer is configured to calculate a first order Ambisonics component for an x direction by performing the calculation of a difference between the first transport signal and the second transport signals, and to calculate an omnidirectional first order Ambisonics component using an addition of the first transport signal and the second transport signal, and to calculate another first order Ambisonics component using a sum of the first transport signal and the second transport signal.

22. The apparatus of claim 13, wherein the spatial audio synthesizer is configured to calculate the different first order Ambisonics components of the spatial audio representation additionally using spatial parameters.

23. The apparatus of claim 13, wherein the transport metadata comprise information on the transport signals being derived from microphone signals at two different positions or with different look directions, wherein the spatial audio synthesizer is configured to select a reference signal that comprises a position that is closest to a loudspeaker position, or to select a reference signal that comprises a closest look direction with respect to the direction from a reference position of the spatial audio representation and a loudspeaker position, or wherein the spatial audio synthesizer is configured to perform a linear combination with the transport signals to determine a reference signal for a loudspeaker being placed between two look directions indicated by the transport metadata.

24. The apparatus of claim 13, wherein the transport metadata comprises information on a distance between microphone positions associated with the transport signals, wherein the spatial audio synthesizer comprises a diffuse signal generator, and wherein the diffuse signal generator is configured to control an amount of a decorrelated signal in a diffuse signal generated by the diffuse signal generator using the information on the distance, so that, for a first distance, a higher amount of decorrelated signal is comprised in the diffuse signal compared to an amount of decorrelated signal for a second distance, wherein the first distance is lower than the second distance, or wherein the spatial audio synthesizer is configured to calculate, for a first distance between the microphone positions, a component signal for the spatial audio representation using an output signal of a decorrelation filter configured for decorrelating a reference signal or a scaled reference signal and the reference signal weighted using a gain derived from a sound direction of arrival information and to calculate, for a second distance between the microphone positions, a component signal for the spatial audio representation using the reference signal weighted using a gain derived from a sound direction of arrival information without any decorrelation processing, the second distance being greater than the first distance or being greater than a distance threshold.

25. The apparatus of claim 13, wherein the transport metadata comprises information on a beamforming or a spatial filtering associated with the transport signals of the transport representation, and wherein the spatial audio synthesizer is configured to generate a loudspeaker signal for a loudspeaker using the transport signal comprising a look direction being closest to a look direction from a reference position of the spatial audio representation to the loudspeaker.

26. The apparatus of claim 13, wherein the spatial audio synthesizer is configured to determine component signals of the spatial audio representation as a combination of a direct sound component and a diffuse sound component, wherein the direct sound component is acquired by scaling a reference signal with a factor depending on a diffuseness parameter or a directional parameter, wherein the directional parameter depends on a direction of arrival of sound, wherein the determination of the reference signal is performed based on the information on the transport metadata, and wherein the diffuse sound component is determined using the same reference signal and the diffuseness parameter.

27. The apparatus of claim 13, wherein the spatial audio synthesizer is configured to determine component signals of the spatial audio representation as a combination of a direct sound component and a diffuse sound component, wherein the direct sound component is acquired by scaling a reference signal with a factor depending on a diffuseness parameter or a directional parameter, wherein the directional parameter depends on a direction of arrival of sound, wherein the determination of the reference signal is performed based on the information on the transport metadata, and wherein the diffuse sound component is determined using a decorrelation filter, the same reference signal, and the diffuseness parameter.

28. The apparatus of claim 13, wherein the transport representation comprises at least two different microphone signals, wherein the transport metadata comprises information indicating, whether the at least two different microphone signals are at least one of omnidirectional signals, dipole signals or cardioid signals, and wherein the spatial audio synthesizer is configured for adapting a reference signal determination to the transport metadata to determine, for components of the spatial audio representation, individual reference signals and for calculating the respective component using the individual reference signal determined for the respective component.

29. A method for encoding a spatial audio representation representing an audio scene to acquire an encoded audio signal, the method comprising:

generating a transport representation from the spatial audio representation;

generating transport metadata related to the generation of the transport representation;

deriving spatial parameters from the spatial audio representation; and multiplexing encoded information on the transport representation, encoded information on the spatial parameters, and encoded information on the transport metadata to obtain the encoded audio signal, generating the encoded audio signal, the encoded audio signal comprising information on the transport representation, information on the spatial parameters, and information on the transport metadata, wherein the spatial audio representation is a first order Ambisonics or a higher order Ambisonics representation comprising a multitude of coefficient signals, or a multi-channel representation comprising a plurality of audio channels, wherein the generating the transport comprises combining two more coefficient signals from the higher order Ambisonics representation or the first order Ambisonics representation, or combining two or more audio channels from the multichannel representation, and wherein the generating the transport metadata comprises generating, as the transport metadata, information on how the two or more coefficient signals from the higher order Ambisonics representation or the first order Ambisonics representation or the two or more audio channels from the multichannel representation have been combined, or which ones of the two or more coefficient signals from the first order Ambisonics representation or the higher order Ambisonics representation or which ones of the two or more audio channels from the multichannel representation have been combined.

30. The method of claim 29, further comprising deriving spatial parameters from the spatial audio representation, and wherein the encoded audio signal additionally comprises information on the spatial parameters.

31. The method for decoding an encoded audio signal, the method comprising:

receiving the encoded audio signal comprising, in a multiplexed form, encoded information on a transport representation comprising a plurality transport signals, encoded information on spatial parameters, and encoded information on transport metadata; and synthesizing a spatial audio representation using the information on the transport representation, the information on the spatial parameters, and the information on the transport metadata, wherein the transport metadata indicates a first transport signal of the plurality of transport signals as referring to a first sector or hemisphere related to a reference position of the spatial audio representation and a second transport signal of the plurality of transport signals as referring to a second different sector or hemisphere related to the reference position of the spatial audio representation, wherein the synthesizing comprises generating a component signal of the spatial audio representation associated with the first sector or hemisphere using the first transport signal and without using the second transport signal, or generating another component signal of the spatial audio representation associated with the second sector or hemisphere using the second transport signal and not using the first transport signal, or wherein the transport metadata indicate information on look directions of the plurality transport signals of the transport representation, and wherein the synthesizing comprises calculating different first order Ambisonics components of the spatial audio representation using the information on the look directions, and using the transport signals.

32. The method of claim 31, further comprising receiving information on spatial parameters, and wherein the synthesizing additionally uses the information on the spatial parameters.

33. A non-transitory digital storage medium having a computer program stored thereon to perform, when said computer program is run by a computer, the method for encoding a spatial audio representation representing an audio scene to acquire an encoded audio signal, the method comprising:

generating a transport representation from the spatial audio representation;

generating transport metadata related to the generation of the transport representation;

deriving spatial parameters from the spatial audio representation; and multiplexing encoded information on the transport representation, encoded information on the spatial parameters, and encoded information on the transport metadata to obtain the encoded audio signal, generating the encoded audio signal, the encoded audio signal comprising information on the transport representation, information on the spatial parameters, and information on the transport metadata, wherein the spatial audio representation is a first order Ambisonics or a higher order Ambisonics representation comprising a multitude of coefficient signals, or a multi-channel representation comprising a plurality of audio channels, wherein the generating the transport comprises combining two more coefficient signals from the higher order Ambisonics representation or the first order Ambisonics representation, or combining two or more audio channels from the multichannel representation, and wherein the generating the transport metadata comprises generating, as the transport metadata, information on how the two or more coefficient signals from the higher order Ambisonics representation or the first order Ambisonics representation or the two or more audio channels from the multichannel representation have been combined, or which ones of the two or more coefficient signals from the first order Ambisonics representation or the higher order Ambisonics representation or which ones of the two or more audio channels from the multichannel representation have been combined.

34. A non-transitory digital storage medium having a computer program stored thereon to perform, when said computer program is run by a computer, the method for decoding an encoded audio signal, the method comprising:

receiving the encoded audio signal comprising, in a multiplexed form, encoded information on a transport representation comprising a plurality of transport signals, encoded information on spatial parameters, and encoded information on transport metadata; and synthesizing a spatial audio representation using the information on the transport representation, the information on the spatial parameters, and the information on the transport metadata, wherein the transport metadata indicates a first transport signal of the plurality of transport signals as referring to a first sector or hemisphere related to a reference position of the spatial audio representation and a second transport signal of the plurality of transport signals as referring to a second different sector or hemisphere related to the reference position of the spatial audio representation, wherein the synthesizing comprises generating a component signal of the spatial audio representation associated with the first sector or hemisphere using the first transport signal and without using the second transport signal, or generating another component signal of the spatial audio representation associated with the second sector or hemisphere using the second transport signal and not using the first transport signal, or wherein the transport metadata indicate information on look directions of the plurality of transport signals of the transport representation, and wherein the synthesizing comprises calculating different first order Ambisonics components of the spatial audio representation using the information on the look directions s, and using the transport signals.

* * * * *